(12) United States Patent
Tsuchiya et al.

(10) Patent No.: US 7,828,405 B2
(45) Date of Patent: Nov. 9, 2010

(54) CORRECTION TABLE GENERATION METHOD AND METHOD OF CONTROLLING CORRECTION TABLE GENERATION APPARATUS

(75) Inventors: Okinori Tsuchiya, Kanagawa (JP);
Shigeyasu Nagoshi, Kanagawa (JP);
Akihiko Nakatani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 11/600,790

(22) Filed: Nov. 17, 2006

(65) Prior Publication Data

US 2007/0064043 A1 Mar. 22, 2007

Related U.S. Application Data

(62) Division of application No. 11/132,244, filed on May 19, 2005, now Pat. No. 7,137,683, which is a division of application No. 10/656,132, filed on Sep. 8, 2003, now Pat. No. 6,945,626.

(30) Foreign Application Priority Data

Sep. 9, 2002 (JP) ............................. 2002-263220
Sep. 9, 2002 (JP) ............................. 2002-263223

(51) Int. Cl.
*B41J 29/393* (2006.01)
(52) U.S. Cl. .................. 347/19; 347/14; 400/74
(58) Field of Classification Search ............ 347/12, 347/14, 15, 19, 37, 57–59; 358/406, 504; 400/74

See application file for complete search history.

(56) References Cited

U.S. PATENT DOCUMENTS

| | | | |
|---|---|---|---|
| 5,796,865 A | 8/1998 | Aoyama et al. | 382/169 |
| 6,203,133 B1 | 3/2001 | Tanaka et al. | 347/15 |
| 6,313,924 B2 | 11/2001 | Kanamori | 358/1.9 |
| 6,406,117 B2 | 6/2002 | Kuno et al. | 347/15 |

(Continued)

FOREIGN PATENT DOCUMENTS

JP 1-231571 9/1989

(Continued)

OTHER PUBLICATIONS

Japanese Official Communication dated Jun. 22, 2007, regarding Japanese Application 2002-263220.

(Continued)

*Primary Examiner*—Juanita D Stephens
(74) *Attorney, Agent, or Firm*—Fitzpatrick, Cella, Harper & Scinto

(57) ABSTRACT

In a multi-valued printer that uses discontinuous index patterns, if a tone correction table is generated using sampled density patches, a table which is different from a table to be obtained and has no inflection point is obtained, and the print density characteristics after tone correction suffer discontinuity. To solve this problem, an output gamma table used to output measurement patches is set to linearly correct the printer print characteristics. Patches are output and their densities are measured. A reverse table of a "signal value—density" table is generated, and is smoothed using a recursive curve. The smoothed reverse table is finely adjusted to generate an intermediate output gamma table. The generated table undergoes index component correction, thus generating a tone correction table.

9 Claims, 36 Drawing Sheets

U.S. PATENT DOCUMENTS

| | | | |
|---|---|---|---|
| 6,832,825 B1 * | 12/2004 | Nishikori et al. | 347/19 |
| 2001/0007456 A1 | 7/2001 | Kuno et al. | 347/15 |
| 2001/0007599 A1 | 7/2001 | Iguchi et al. | 382/274 |
| 2001/0012110 A1 | 8/2001 | Kanamori | 358/1.9 |
| 2002/0048031 A1 | 4/2002 | Suwa et al. | 358/1.9 |
| 2002/0154326 A1 | 10/2002 | Tsuchiya et al. | 358/1.9 |

FOREIGN PATENT DOCUMENTS

| | | |
|---|---|---|
| JP | 2-167755 A | 6/1990 |
| JP | 8-2659 B | 1/1996 |
| JP | 8-98025 | 4/1996 |
| JP | 8-214164 | 8/1996 |
| JP | 8-286442 | 11/1996 |
| JP | 9-46522 A | 2/1997 |
| JP | 10-136209 | 6/1998 |
| JP | 2000-71439 | 3/2000 |
| JP | 2000-295478 | 10/2000 |
| JP | 2000-307853 | 11/2000 |
| JP | 2001-191589 | 7/2001 |

OTHER PUBLICATIONS

Japanese Official Communication dated Aug. 20, 2007, regarding Japanese Application 2002-263220.

* cited by examiner

FIG. 3

| INDEX NUMBER | SIGNAL VALUE (CENTRAL VALUE) 8bit | SIGNAL VALUE (CENTRAL VALUE) 12bit | NUMBER OF DOTS/ (600-DPI GRID) |
|---|---|---|---|
| 0 | 0 | 0 | 0 |
| 1 | 64 | 1024 | 1 |
| 2 | 128 | 2048 | 2 |
| 3 | 192 | 3072 | 3 |
| 4 | 255 | 4080 | 4 |

FIG. 13

| INDEX NUMBER | SIGNAL VALUE (CENTRAL VALUE) 8bit | SIGNAL VALUE (CENTRAL VALUE) 12bit | NUMBER OF DOTS/ (600-DPI GRID) |
|---|---|---|---|
| 0 | 0 | 0 | 0 |
| 1 | 85 | 1360 | 1 |
| 2 | 170 | 2720 | 2 |
| 3 | 255 | 4080 | 4 |

F I G. 17
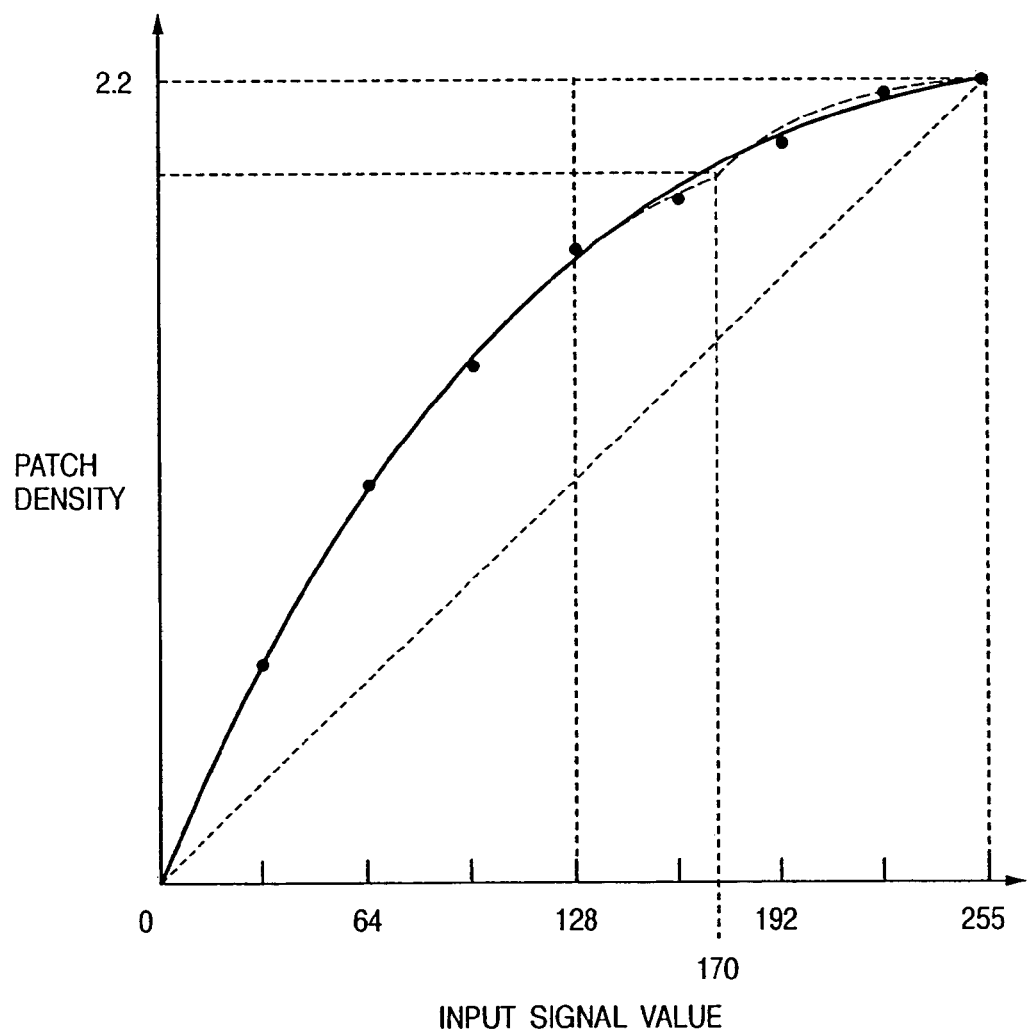

FIG. 27

| MEDIA | DOT QUANTITY (WHEN A = 100%) | TONE CORRECTION TABLE | RGB/CMYK COLOR CONVERSION TABLE |
|---|---|---|---|
| A | 100% | A | A |
| B | 80% | B | A |
| C | 120% | C | C |

CORRECTION TABLE GENERATION METHOD AND METHOD OF CONTROLLING CORRECTION TABLE GENERATION APPARATUS

This application is a division of U.S. application Ser. No. 11/132,244, filed May 19, 2005, and issued as U.S. Pat. No. 7,137,683, which is a division of U.S. application Ser. No. 10/656,132, filed Sep. 8, 2003, and issued as U.S. Pat. No. 6,945,626, the entire disclosure of which is incorporated herein by reference.

FIELD OF THE INVENTION

The present invention relates to a correction table generation method, and a method of controlling a correction table generation apparatus and, more particularly, to generation of a correction table which is used to correct the print characteristics of a printing apparatus, which has nonlinear characteristics between an input signal value and a print signal value output in accordance with the input signal value.

BACKGROUND OF THE INVENTION

A printing apparatus such as a printer, copying machine, facsimile, or the like prints an image defined by dot patterns on a print medium such as a paper sheet, thin plastic plate, or the like on the basis of image information. Such printing apparatus can be categorized into an ink-jet system, wire-dot system, thermal system, laser beam system, and the like in accordance with the printing systems. Of these systems, the ink-jet system (ink-jet printing apparatus) prints an image by ejecting ink (print liquid) droplets from ejection ports of a print head and attaching them on a print medium.

As an example of a printing apparatus, an ink-jet printing apparatus (ink-jet printer) with an output resolution of 600 dpi will be described. This printer prints an image by receiving a binary (multi-valued) dot image, which is obtained by rasterizing 300-dpi, 8-bit image data and is transferred from a host (PC).

The ink-jet printing apparatus prints an image by combining pixels (dot ON) formed by print liquid droplets landing on a print medium, and pixels (dot OFF) without any print liquid droplet.

In recent years, since the ejection ports of a print head can be arranged at a high density, an image with a relatively high resolution (e.g., 600 dpi) can be printed. In order to obtain a high-definition print, when a host as a supply source of image data connected to a printer processes high-resolution (e.g., 600 dpi) image data and transfers the processed data to the printer, the data size becomes four times that required upon transferring 300-dpi image data, and the data processing time and transfer time increase largely. Hence, a method of handling a binary dot matrix as a multi-valued super pixel on the printer side (Japanese Patent Laid-Open No. 9-46522) is used.

[Multi-valued Printer Using Index Pattern]

Japanese Patent Laid-Open No. 9-46522 discloses the following technique for reducing the loads on the data process and transfer. With this technique, a binary ink-jet printer with an output resolution of 600 dpi handles, as one set, 2×2 binary pixels of a resolution of 600 dpi, and a host handles that printer as a 5-valued printer with a resolution of 300 dpi.

FIG. 1 shows a layout method of ON dots when 2×2 binary pixels of a resolution of 600 dpi are used as one set. A set of 2×2 pixels will be referred to as a "super pixel", and the layout of ON dots will be referred to as an "index pattern" hereinafter.

As shown in FIG. 1, a super pixel has five different index patterns, which respectively have zero, one, two, three, and four ON dots. A printer, which holds such index pattern in advance, prints an image by rasterizing 300-dpi, 5-valued image data input from the host to 600-dpi, binary image data with reference to the index patterns.

Pseudo halftoning in the printer using the index patterns will be explained below.

The host can consider the aforementioned binary printer with the output resolution of 600 dpi as a 5-valued printer with an input resolution of 300 dpi, since the printer main body executes a rasterization process of the index patterns. Hence, the host rasterizes 300-dpi, 8-bit input image data to a 5-valued dot image by known pseudo halftoning such as multi-valued error diffusion, multi-valued dithering, or the like, and supplies the dot image to the printer.

FIG. 2 shows an average distribution of the number of index patterns assigned per unit area (ordinate) with respect to the signal value of an 8-bit input image signal (abscissa). Note that "average" means that error diffusion and dithering often have different numbers of locally printed dots at the beginning of processing of an image to be processed, and such local difference is not taken into consideration.

As shown in FIG. 2, for example, when the signal value is "0", all pixels of 300 dpi are occupied by index patterns of index No. 0; when the signal value is "64", all pixels of 300 dpi are occupied by index patterns of index No. 1. FIG. 3 summarizes correspondence between the signal values (central values) and index numbers. Note that pixels of index Nos. 0 and 1 mix in a region of 0<signal value<64, and those of index Nos. 1 and 2 mix in a region of 64<signal value<128.

FIG. 4 shows the average number of 600-dpi, binary ON dots per unit area (ordinate) with respect to the signal value of an 8-bit input image signal (abscissa).

For example, in a region of 0<signal value<64, the number of index patterns of index No. 0 decreases, and that of index patterns of index No. 1 increases. That is, in the region of 0<signal value<64, the number of ON dots increases with increasing number of index patterns of index No. 1, as indicated by the solid line in FIG. 4.

In a region of 64<signal value<128, the number of index patterns of index No. 1 decreases, and that of index patterns of index No. 2 increases. Hence, in the region of 64<signal value<128, since the number of ON dots formed by index patterns of index No. 1 (600 dpi, one ON dot per four pixels) decreases, and the number of ON dots formed by index patterns of index No. 2 (600 dpi, two ON dots per four pixels) increases, as indicated by the broken line in FIG. 4, the total number of ON dots in the region of 64<signal value<128 increases, as indicated by the solid line in FIG. 4. In this manner, the number of binary ON dots of an output resolution of 600 dpi, which are formed by the 5-valued printer with the input resolution of 300 dpi using the index patterns shown in FIG. 1, increases in proportion to the signal value of the input image signal.

[Print Characteristics of 5-valued Printer with Input Resolution of 300 dpi]

As described above, the signal value of an image signal input to the 5-valued printer with the input resolution of 300 dpi is proportional to the number of ON dots. However, the print density is normally not proportional to the number of ON dots due to mechanical and optical dot gains. FIG. 5 shows the print density (ordinate) upon printing an 8-bit input signal value (abscissa) as a 600-dpi binary pattern. As shown in FIG. 5, the print density shows the tendency of leveling off.

[Tone Correction Table Corresponding to Index Pattern]

In order to compensate for the influence of dot gains shown in FIG. 5 and to correct the relationship between the input signal value and print density to a proportional relationship shown in FIG. 6, a tone correction table disclosed in Japanese Patent Publication No. 8-2659 (called a "density characteristic correction table" in this reference) is used.

In the tone correction table, a table shown in FIG. 7, which defines an inverse function to FIG. 5 used to correct the relationship between the input signal value and print characteristics shown in FIG. 5, is set. A 300-dpi, 8-bit image signal is converted into a tone-corrected image signal by the tone correction table, and then undergoes pseudo halftoning by, e.g., multi-valued error diffusion to be rasterized to a 300-dpi, 5-valued dot image. The rasterized dot image is input to the printer. The printer rasterizes the 300-dpi, 5-valued dot image to a 600-dpi, binary dot image with reference to the index patterns. Then, nozzles of a print head corresponding to ON dots of this binary dot image are driven to eject print liquid droplets.

FIG. 8 is a flow chart for explaining a process for deriving a tone correction table for a 5-valued printer with an input resolution of 300 dpi.

The tone correction table is derived by executing a print process of the printer in correspondence with an input signal value, measuring the density of a print, and calculating a table which compensates for the measured density characteristics. Note that output characteristics of the printer can be examined by measuring intensity or brightness of the print instead of the density of the print. In other words, the examination of the output characteristics of the printer can be performed based on amounts indicating brightness, such as the intensity, brightness or density of the print, signal values read from the print by using a scanner, or the like. In the following explanation, the density is used as the amounts which quantitatively show the characteristics of the printer, but the above intensity, brightness or signal values can be used as the amounts which quantitatively show the characteristics of the printer, too.

It doesn't matter even if the quantity except that brightness is shown is substituted for this concentration though concentration is used as the representative of the quantity which shows brightness and it explains.

An output gamma used to output measurement patches (a tone correction table shown in FIG. 9 that allows an input signal value to pass through it) is set (S102), and measurement patches are set (S103). The measurement patches are output (S104), and the densities of the output patches are measured by a densitometer (S105).

As the measurement patches, those shown in FIG. 10 are used in consideration of a reduction of a time required from printing to measurement, and print reproducibility by the ink-jet printer. Numerals printed above respective patches shown in FIG. 10 indicate the signal values of the patches, and letters C, M, Y, and K on the upper end indicate inks used to print patch sequences below these letters.

A "signal value—density" table is generated based on the patch density measurement result, and a "signal value—density" table obtained by normalizing the signal values and density values in the former table to the range from 0 to 1, as shown in FIG. 11, is generated. In order to obtain an inverse function of this normalized table, the normalized table is referred to in the reverse direction to generate a reverse table of the "signal value—density" table (S106).

As indicated by ● marks in FIG. 11, the measurement values of actual densities include errors due to reproducibility of the ink-jet printer upon printing, and measurement errors. Hence, the reverse table undergoes smoothing based on a recursive curve using polynomial approximation given by:

$$y = c_1 x + c_2 x^2 + c_3 x^3 + c_4 x^4 + c_5 x^5 \quad (1)$$

to obtain a table that shows a smooth curve, as indicated by the solid curve in FIG. 11 (S107). Note that a detailed description of smoothing based on polynomial approximation will be omitted, since a similar process using a spline curve is disclosed in detail in Japanese Patent Publication No. 8-2659.

Deviations due to oscillations of the polynomial approximation and those of an origin (0.0, 0.0) and end point (1.0, 1.0) often occur. In order to correct those deviations, the reverse table is finely adjusted (S108). The range of the reverse table, which has been normalized and finely adjusted in a period from the origin to the end point, is re-converted to a table format of an 8-bit integer, thus generating a tone correction table (S109).

By making tone correction using the tone correction table generated in this way, the tone characteristics can be improved so as to realize linearity between the input image signal value and output print density of the printer.

Note that the tone correction table is a linear table for each ink color, and has a smaller table size than a color conversion table as a three-dimensional (3D) table. Hence, the following applied techniques using a plurality of tone correction tables are available.

Ejection amount correction of print head using tone correction table

Dot quantity correction using tone correction table

The applied techniques using tone correction tables will be described in detail below.

[Ejection Amount Correction of Print Head Using Tone Correction Table]

The output density characteristics of an ink-jet printer depend on the amount of ink ejected from nozzles of a print head. The ejection amounts of mass-produced print heads suffers variations of about ±10% with respect to the standard amount due to variations of the characteristics generated during production.

In general, a color processing unit of a printer is designed to obtain a desired output result on the basis of the standard ejection amount of a print head. In other words, if a print head whose ejection amount deviates from the standard ejection amount is used, the output result becomes different from the standard output result expected upon design. That is, the variations of the ejection amount of the print head cause deterioration of the tone characteristics such as deterioration of color reproducibility, unbalance of density inks, and the like.

To solve this problem, Japanese Patent Laid-Open No. 2-167755 discloses the following ejection amount correction method. In this method, a color processing unit is designed to obtain an optimal output result when the ejection amount of a print head is a lower limit value. When a print head which has an ejection amount equal to or larger than the lower limit value is used, the ejection amount of the print head used is corrected using a tone correction table to be equivalent to that of a print head whose ejection amount is the lower limit value.

FIG. 24 is a block diagram showing the arrangement of a printer driver 1300 (color processing unit) which runs on a host, and an ink-jet-printer 1400.

R, G, and B image signals (300 dpi, 8 bits per color) input to a printer driver 1300 are converted into C, M, Y, and K signals (300 dpi, 8 bits per color) by a 3D lookup table (3DLUT) of an RGB/CMYK converter 1301. Note that a process for a 300-dpi, 8-bit cyan (C) signal will be explained below, but the same applies to those for other color component signals.

The 300-dpi, 8-bit (256-valued) cyan (C) signal undergoes tone correction in a tone correction unit 1302 and is expanded to 12 bits (4081 values). In this case, a tone correction table used by the tone correction unit 1302 is selected from a tone correction table database 1305 on the basis of independently input ejection amount information of the print head. The expanded 300-dpi, 12-bit C signal undergoes pseudo halftoning by a multi-valued error diffusion processor 1303 to be converted into a 300-dpi, 3-bit (5-valued) multi-valued dot image.

The 300-dpi, 3-bit multi-valued dot image is transferred (input) from the host to a printer 1400. The 300-dpi, 3-bit multi-valued dot image input to the printer 1400 is rasterized to a 600-dpi, binary dot image by a dot image rasterize processor 1401, which refers to index patterns of a super pixel stored in an index pattern memory 1402.

The 600-dpi, binary dot image is stored in a dot image rasterize buffer 1403, and is sequentially sent to a print unit 1404 in correspondence with nozzles arranged in an ink-jet print head at 600-dpi intervals. Print nozzles corresponding to ON dots of the 600-dpi, binary dot image are driven, thus ejecting print liquid droplets.

A method of deriving the tone correction table used by the tone correction unit 1302 in ejection amount correction, and the correction method will be described below. A case will be exemplified wherein continuous index patterns are used, and print heads are roughly classified into the following three ranks on the basis of their ejection amounts.

Lower limit value (small ejection amount): n [ng]
Central value (middle ejection amount): 1.05n [ng]
Upper limit value (large ejection amount): 1.10n [ng]

When a 12-bit tone correction table is generated using a print head of the small ejection amount rank, and a maximum value "4080" of that tone correction table is assigned to a print head of the small ejection amount rank, the ejection amount is 4080×n [ng]. Hence, the maximum values of tone correction tables which can yield the same ejection amount for the remaining ejection amount ranks are as follows:

Maximum value of tone correction table of middle ejection amount=4080×n/(1.05×n)≈3886

Maximum value of tone correction table of large ejection amount=4080×n/(1.1×n) 3709

By controlling to obtain an identical ejection amount after tone correction using the tone correction table generated for each ejection amount of a print head, a similar output result can be obtained independently of the ejection amount ranks of print heads.

The maximum values of tone correction tables have been explained. Likewise, when a 12-bit tone correction table is generated using a print head of the middle ejection amount rank, an identical ejection amount can be obtained for all input/output image signal values independently of the ejection amount ranks of print heads by setting the central values of tone correction tables of the remaining ejection amount ranks as:

Correction value of large ejection amount rank=correction value of middle ejection amount rank×3709/3886

Correction value of small ejection amount rank=correction value of middle ejection amount rank×4080/3886

A sequence for generating a tone correction table (maximum value=3886) for a print head of the middle ejection amount rank using a print head of the middle ejection amount rank will be described below with reference to the flow chart in FIG. 8. Note that a description of substantially the same processes in FIG. 8 will be omitted, and only different processes will be explained.

FIG. 25 shows the input/output characteristics of a printer in which the maximum value of the 12-bit tone correction table is "4080". In FIG. 25, broken curve b represents the output density characteristics, which have been normalized to 10 bits, and its inverse function (broken curve c) is the tone correction table.

In this case, since a tone correction table having a maximum value=3886 is obtained using a print head of the middle ejection amount rank, the output density characteristics indicated by broken curve b are converted into the characteristics indicated by solid curve a, and its inverse function (solid curve d) is obtained.

In order to obtain a tone correction table indicated by solid curve d in step S106 of generating the reverse table, the following two methods are available.

First Method (b→a→d)

The inverse function of the tone correction table having the maximum value=3886 is represented by solid curve a. As shown in FIG. 25, solid curve a sticks to the upper limit in a region where the input signal value is equal to or higher than 243 (≈3886/4080×255). Therefore, the range of ordinate y in FIG. 25 is defined by that from 0 to 1, and curves a and b shown in FIG. 25 are respectively expressed as y=a(x) and y=b(x) using function names corresponding to the signs of these curves. Then, the following relationship is obtained.

$$y=a(x)=b(x)/b(243/255)$$

for $0 \leq x \leq 243/255$ $$y=a(x)=1$$

for $243/255 < x \leq 255/255$

The tone correction table is defined by an inverse function y=d(x) of y=a(x).

Second Method (b→c→d)

y=c(x) as a correction table having a maximum value=4080 is calculated, and a tone correction table y=d(x) is calculated based on this table.

$$d(x)=c(3886/4080 \times x)$$

Next, x and y in equation (1) used in polynomial approximation of the reverse table y=d(x) in step S109 of generating the tone correction table assume real numbers ranging from 0 to 1. Hence, in order to set the maximum value of the tone correction table to 3886, the calculation result of equation (1) is multiplied by 3886 and the product is rounded to an integer, thus obtaining the tone correction table.

Tone correction tables for print heads of the large and small ejection amount ranks can be calculated on the basis of the calculated tone correction table for a print head of the middle ejection amount rank by:

Correction value for large ejection amount rank=correction value of middle ejection amount rank×3709/3886

Correction value for small ejection amount rank=correction value of middle ejection amount rank×4080/3886

[Dot Quantity Correction Using Tone Correction Table]

Dot quantity correction using a tone correction table will be explained below.

Since an ink-jet printer prints an image by directly spraying ink onto a print medium, if the ink dot quantity (applied quantity) is larger than the ink acceptable quantity (upper limit value of ink dot quantity) of a print media (print sheet), beading (ink overflow, blur due to ink overflow) occurs.

The upper limit value of the ink dot quantity varies depending on the characteristics of print media. Hence, in order to execute a color process in correspondence with print media having different upper limit values of the dot quantity, a tone correction table is often adjusted with respect to a common color conversion table in the RGB/CMYK converter 1301 to adjust the dot quantity.

FIG. 26 is a block diagram showing the arrangement of a printer driver 1300 (color processing unit) which runs on the host, and an ink-jet printer 1400. FIG. 26 shows the arrangement when the printer driver makes ejection amount correction of a print head using a tone correction table. FIG. 27 is a view for explaining the storage contents of a database 1304 (see FIG. 26).

When color conversion table A and tone correction table A for print medium A with an ink acceptable quantity of 100% are already present, for example, color conversion table A for print medium A is diverted for print medium B with an ink acceptable quantity of 80%, and a tone correction table is re-generated so as to reduce the size of the database 1304, thus realizing a color process that meets the ink acceptable amount of print medium B in some cases.

When R, G, and B image data (300 dpi, 8 bits per color) are input to a printer driver (color processing unit) 1300, the input image data undergo RGB→CMYK color conversion by a 3DLUT of a color converter 1301 after color correction so as to be converted into C, M, Y, and K data. The C, M, Y, and K image data undergo tone correction by a tone correction unit 1302, and then multi-valued pseudo halftoning by a multi-valued error diffusion processor 1303. Then, the C, M, Y, and K image data are output to a printer 1400. At this time, color processing tables used in the color converter 1301 and tone correction unit 1302 are selected from a database 1304 on the basis of information associated with the type of print medium, which is input at, e.g., a user interface (not shown) provided by the printer driver 1300. For example, when the input type of print medium corresponds to print medium B, color conversion table A and tone correction table B shown in FIG. 27 are set in the color converter 1301 and tone correction unit 1302.

Since tone correction tables A and B having a function of adjusting the dot quantity are used between print media having different dot quantities, a color process is done using common color conversion table A, as shown in FIG. 27. Tone correction table B having a function of adjusting the dot quantity will be explained below.

Assume that if the ink acceptable quantity of print medium A is equal to the maximum dot quantity of a color processing table (a set of a color conversion table and tone correction table) generated for a print head of the middle ejection amount rank, and this dot quantity (ink acceptable quantity) is 100%, print medium B has an ink acceptable quantity 80% of that of print medium A. When a color conversion table for print medium A is diverted as one of color conversion table sets for print medium B, a tone correction table that meets the ink acceptable quantity of print medium B can be calculated by:

Tone correction value for print medium B=tone correction value for print medium A×0.8

The tone correction table for print medium B sets a dot quantity 80% of that of the tone correction table for print medium A throughout the medium. Therefore, when tone correction is made using the calculated tone correction table, image data can undergo a color process so as not to exceed the ink acceptable quantity of print medium B even when the color process is done using "color conversion table for print medium A"+"tone correction table for print medium B".

[Multi-valued Printer Using Discontinuous Index Patterns]

Along with the price reduction and technical advances of printers, printers are demanded to assure higher resolution and to have a smaller memory size in their main bodies. To realize such printers, an arrangement which uses discontinuous index patterns shown in FIG. 12 as those of a 600-dpi super pixel of 2×2 pixels, and suppresses the memory size by reducing index numbers is adopted.

As shown in FIG. 12, four different index patterns, which respectively have zero, one, two, and four ON dots, are available as the super pixel, and correspond to 300-dpi, 4-valued data. FIG. 13 summarizes correspondence between the signal values (central values) and index numbers, as in FIG. 3.

FIG. 14 shows the number of ON dots with respect to the signal value in a 600-dpi, binary pattern when the index patterns shown in FIG. 12 are used under the condition shown in FIG. 13. As shown in FIG. 14, the number of ON dots is expressed by a polygonal line which inflects at a signal value=170. This is because the number of ON dots decreases by one and increases by two in a region of 0<signal value<170, while it decreases by two and increases by four in a region of 170<signal value<255.

Such system in which the number of ON dots increases in a polygonal line pattern shows the characteristics in which the print density curve inflects at an injection point of an increase in the number of ON dots (corresponding to a switching point of index patterns), as indicated by the solid curve, unlike the print density characteristics of a multi-valued printer using normal (continuous) index patterns, which are indicated by the broken curve in FIG. 15. Therefore, in order to obtain linear print density characteristics by correction, a tone correction table shown in FIG. 16, which corresponds to the print density inflection point shown in FIG. 15, is required.

SUMMARY OF THE INVENTION

The present invention has been made to solve the aforementioned problems individually or together, and has as its object to generate a tone correction table which can accurately correct tone characteristics and can obtain linear output characteristics in a system in which the output of a print signal is discontinuous with respect to an input signal.

It is another object of the present invention to generate a tone correction table which compensates for discontinuous output characteristics and can set linear output characteristics in a printing apparatus having discontinuous output characteristics.

It is still another object of the present invention to generate a tone correction table which can use an identical measurement patch format independently of printer specifications while reducing the number of measurement patches to be printed upon generating a tone correction table, allows processes by simple arithmetic operations, and can easily attain accurate, faithful halftone reproduction.

In order to achieve the above objects, a preferred embodiment of the present invention discloses a generation method of generating a correction table used to correct print characteristics of a printing apparatus which has nonlinear characteristics between an input signal and a print signal to be output in accordance with the input signal, the method comprising steps of:

printing images for measuring amounts of brightness while compensating for the nonlinear characteristics;

measuring amounts of brightness of the printed images;

generating a tone correction table based on the measured amounts of brightness; and applying conversion that considers the nonlinear characteristics to the tone correction table.

A preferred embodiment of the present invention also discloses an image processing method of generating a correction table used to correct print characteristics of a printing apparatus which has nonlinear characteristics between an input signal and a print signal to be output in accordance with the input signal, the method comprising steps of:

printing images for measuring amounts of brightness, which include an image corresponding to an input signal at which the print characteristics inflect;

measuring amounts of brightness of the printed images; and generating a tone correction table based on the measured amounts of brightness.

It is still another object of the present invention to generate a tone correction table which can compensate for discontinuous output characteristics to obtain linear output characteristics in a printing apparatus in which the output of a print signal is discontinuous with respect to an input signal, and has an arbitrary maximum value.

It is still another object of the present invention to generate a tone correction table, which can compensate for discontinuous output characteristics to obtain linear output characteristics in a printing apparatus in which the output of a print signal is discontinuous with respect to an input signal, and has an arbitrary maximum value, on the basis of a tone correction curve that compensates for the discontinuous output characteristics.

In order to achieve the above objects, a preferred embodiment of the present invention discloses a generation method of generating a correction table used to correct print characteristics of a printing apparatus which has nonlinear characteristics between an input signal and a print signal to be output in accordance with the input signal, the method comprising step of generating, on the basis of a first tone correction table which is generated while compensating for the nonlinear characteristics, a second tone correction table having a maximum value different from the first tone correction table.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a table showing the correspondence between the signal values (central values) and index numbers;

FIG. 13 is a table showing the correspondence between the signal values (central values) and index numbers;

FIG. 17 is a graph for explaining discontinuity that has occurred in the print density characteristics after tone correction;

FIG. 27 is a table showing the storage contents of a database;

DETAILED DESCRIPTION OF THE PREFERRED EMBODIMENTS

Image processes according to preferred embodiments of the present invention will be described in detail hereinafter with reference to the accompanying drawings.

First Embodiment

In a multi-valued printer that uses discontinuous index patterns, when a tone correction table is derived by the same method as in the prior art, since the tone correction table is generated using sampled density patches, a table having no inflection point (solid curve) is obtained unlike a table (broken curve) to be obtained, thus causing discontinuity in the print density characteristics after tone correction, as shown in FIG. 17.

Figure 18:
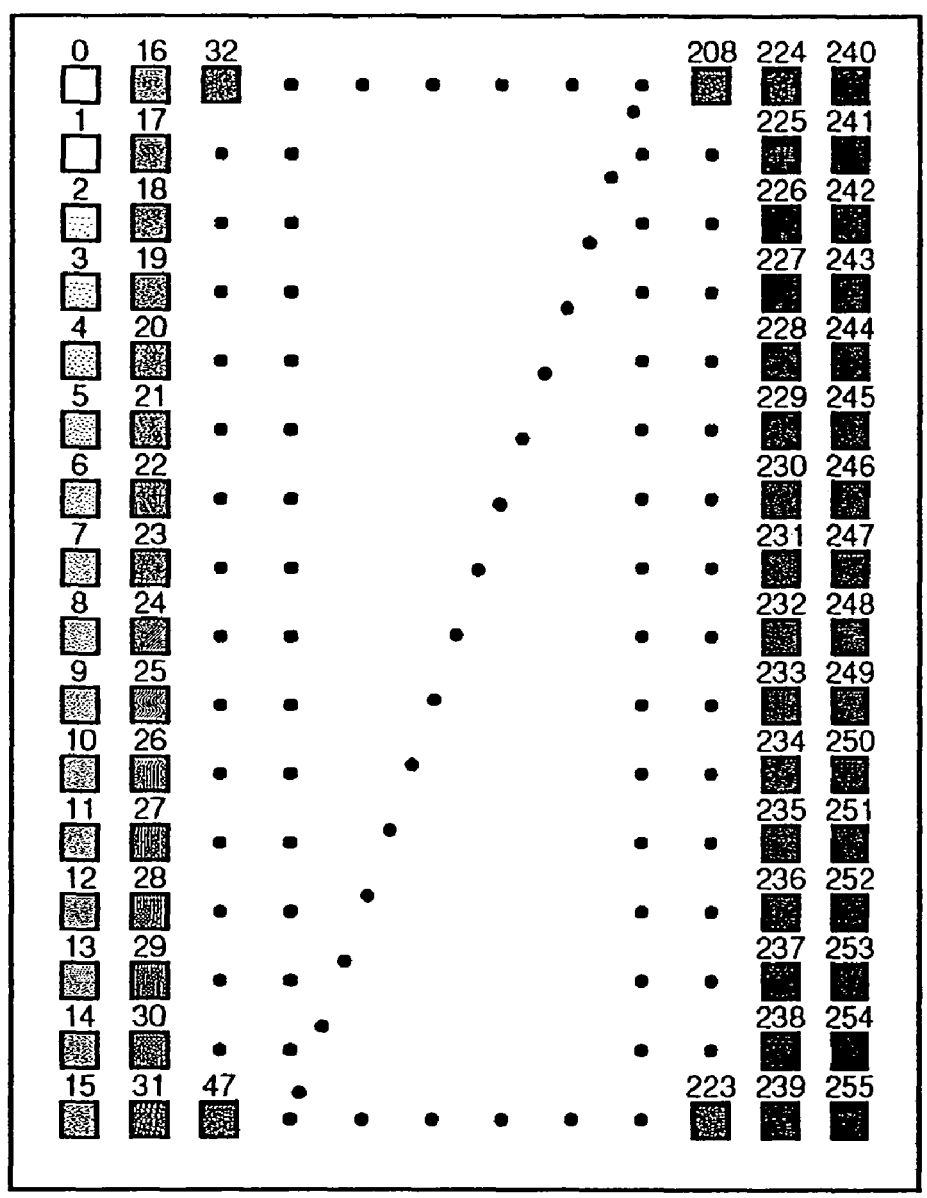
FIG. 18 shows a sheet on which 256-level patches are printed.
Figure 19:
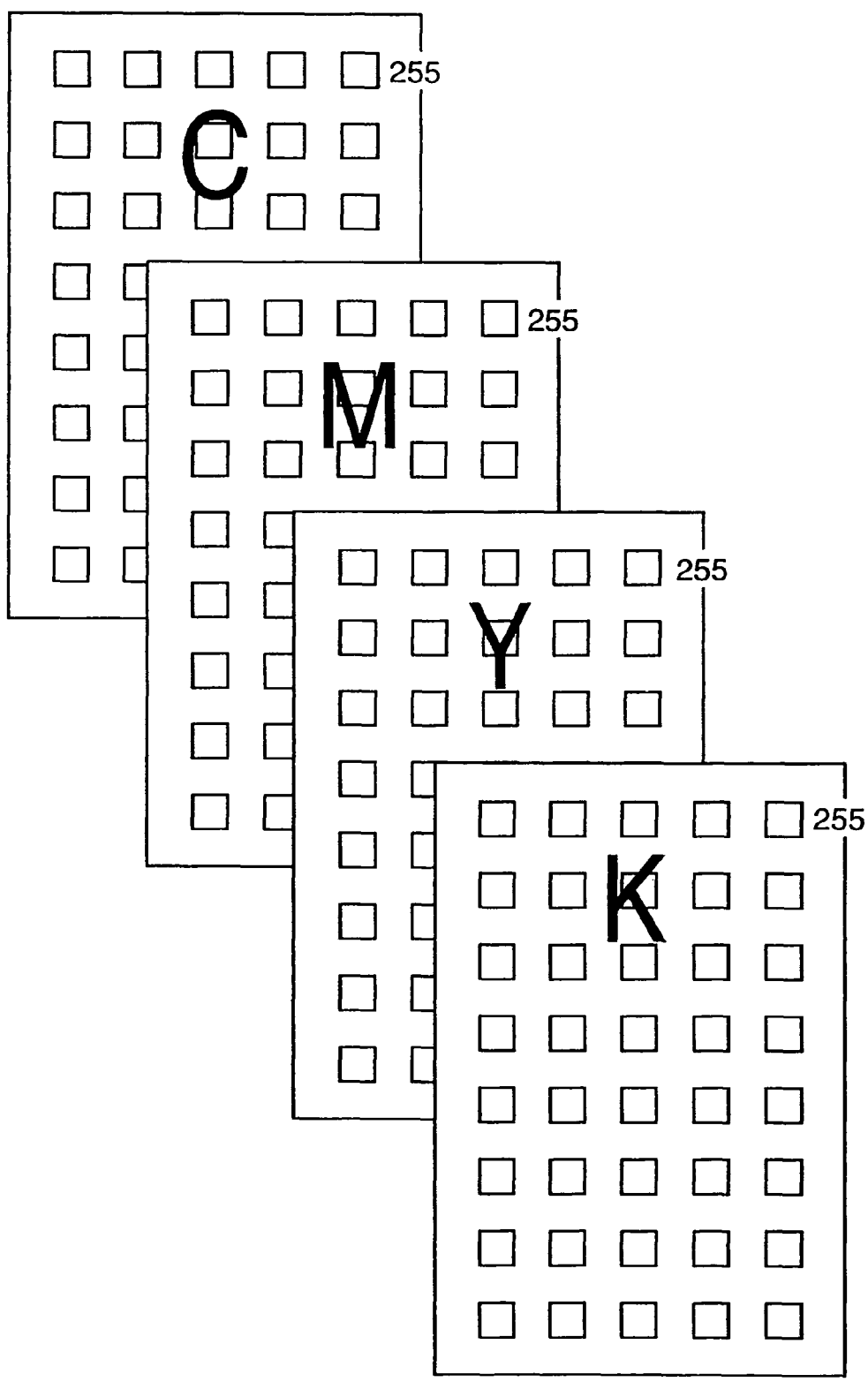
FIG. 19 is a view showing a method of using sheets on which 256-level patches are printed.

When a tone correction table is obtained using sheets, on each of which 256-level patches are printed, as shown in FIG. 18, for respective colors, as shown in FIG. 19, the influence of sampling can be eliminated. However, during printing 1,024 (=256×4) patches, the influences of variations of ejection amount due to the temperature rise of a print head appear, and the influences of print errors readily appear on a single sheet and between different sheets. Under the influences of such errors, the inflection point of the print density curve deviates, thus causing discontinuity in the print density characteristics after tone correction.

Furthermore, a smoothing process of a reverse table using a recur recursive curve requires devices that consider the inflection point, e.g., use of different recursive curves on the right and left sides of the inflection point, resulting in a complicated process.

Hence, this embodiment will explain a method of generating a tone correction table which can accurately correct tone characteristics and can obtain linear output characteristics in a system using discontinuous index patterns.

Also, this embodiment will explain a method of generating a tone correction table which can compensate for discontinuous output characteristics and can set linear output characteristics in a printer using discontinuous index patterns.

Furthermore, this embodiment will explain a method of generating a tone correction table which can use an identical measurement patch format independently of printer specifications while reducing the number of measurement patches to be printed upon generating a tone correction table, allows processes by simple arithmetic operations, and can easily attain accurate, faithful halftone reproduction.

Figure 12:
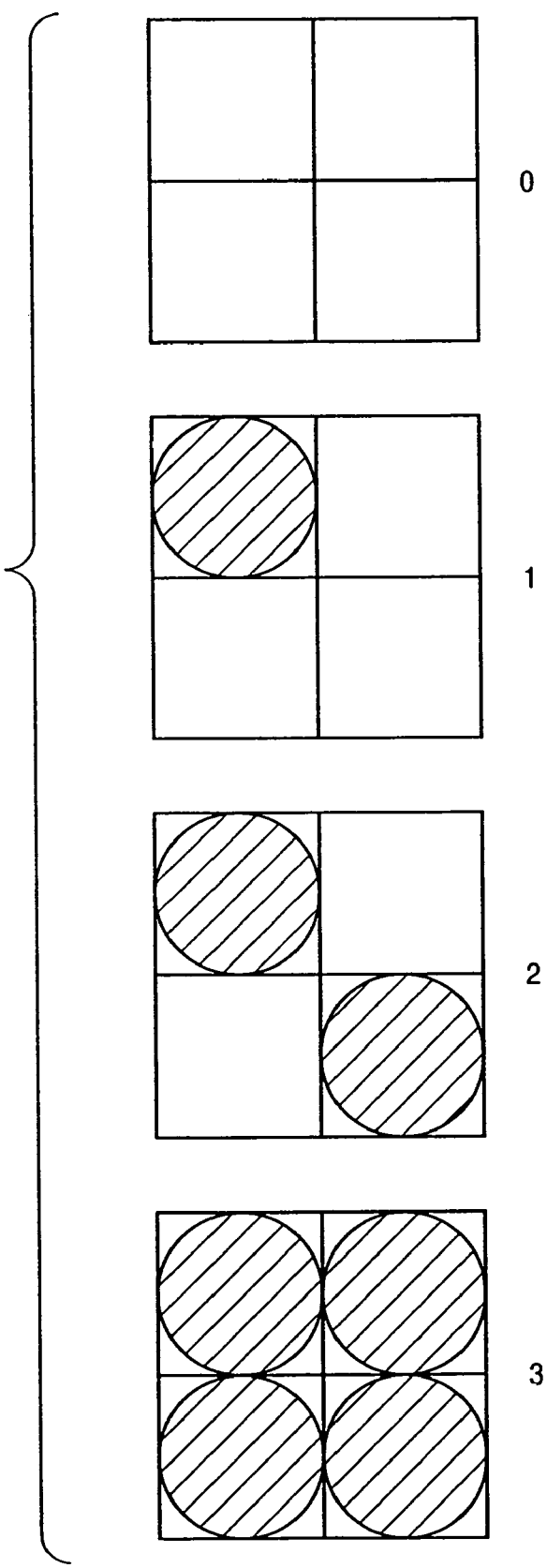
FIG. 12 shows discontinuous index patterns.

The first embodiment will exemplify a case wherein an ink-jet printer which prints binary data at an output resolution of 600 dpi uses 300-dpi, 4-valued index patterns shown in FIG. 12, which correspond to a super pixel of 600-dpi, 2×2 pixels, and a host performs tone correction while considering that ink-jet printer as a multi-valued (4-valued) printer with an input resolution of 300 dpi.

[Arrangement]

Figure 20:
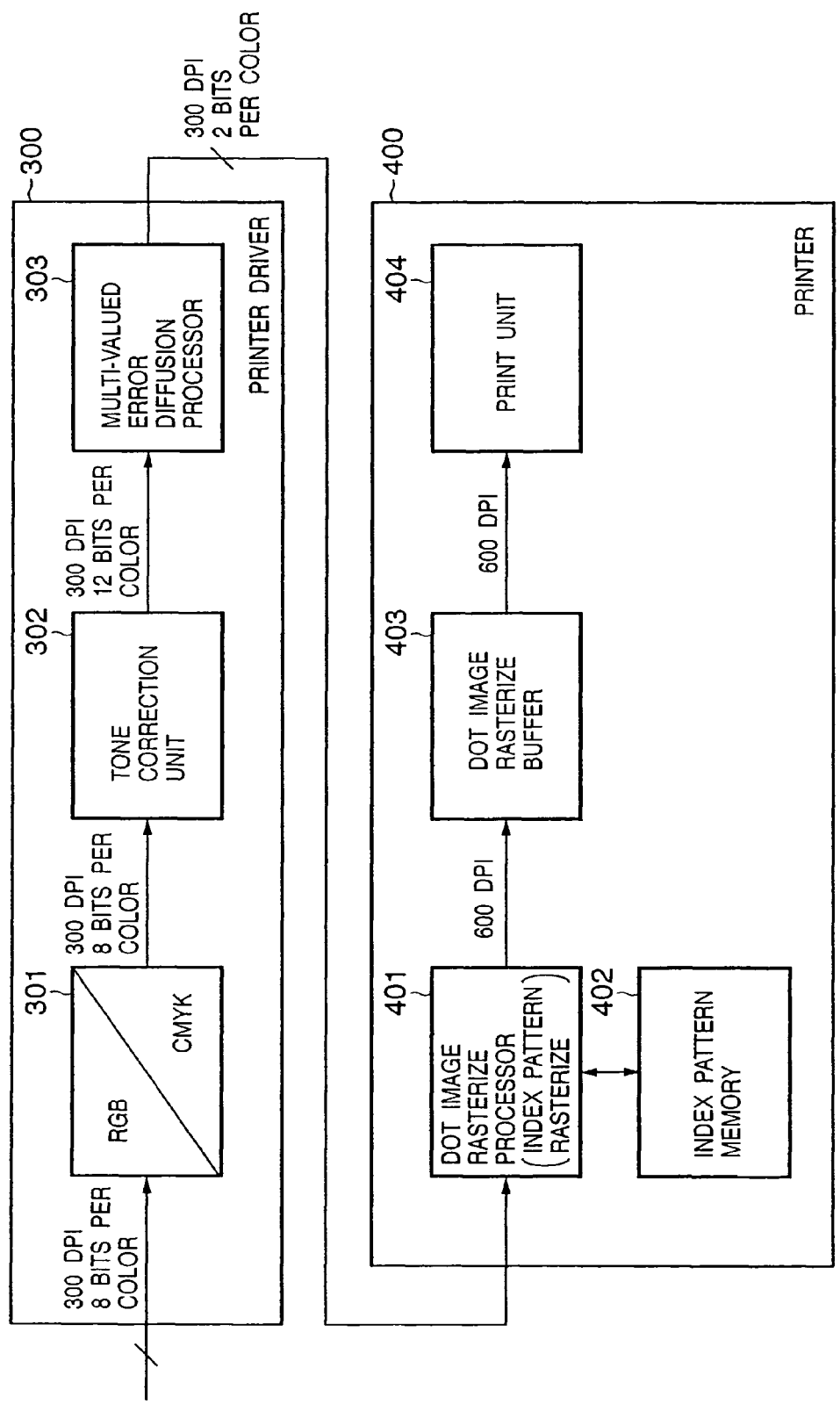
FIG. 20 is a block diagram showing the arrangement of a printer driver which runs on a host, and an ink-jet printer.

FIG. 20 is a block diagram showing the arrangement of a printer driver 300 which runs on a host, and an ink-jet printer 400.

R, G, and B image signals (300 dpi, 8 bits per color) input to a printer driver 300 are converted into C, M, Y, and K signals (300 dpi, 8 bits per color) by an RGB/CMYK converter 301. Note that a process for a 300-dpi, 8-bit cyan (C) signal will be explained below, but the same applies to those for other color component signals.

The 300-dpi, 8-bit (256-valued) cyan (C) signal undergoes tone correction in a tone correction unit 302 and is expanded to 12 bits (4081 values). The expanded 300-dpi, 12-bit C signal undergoes pseudo halftoning by a multi-valued error diffusion processor 303 to be converted into a 300-dpi, 2-bit (4-valued) multi-valued dot image.

The 300-dpi, 2-bit multi-valued dot image is transferred (input) from the host to a printer 400. The 300-dpi, 2-bit multi-valued dot image input to the printer 400 is rasterized to a 600-dpi, binary dot image by a dot image rasterize processor 401, which refers to the index patterns of a super pixel stored in an index pattern memory 402.

The 600-dpi, binary dot image is stored in a dot image rasterize buffer 403, and is sequentially sent to a print unit 404 in correspondence with nozzles arranged in an ink-jet print head at 600-dpi intervals. Print nozzles corresponding to ON dots of the 600-dpi, binary dot image are driven, thus ejecting print liquid droplets.

Figure 14:
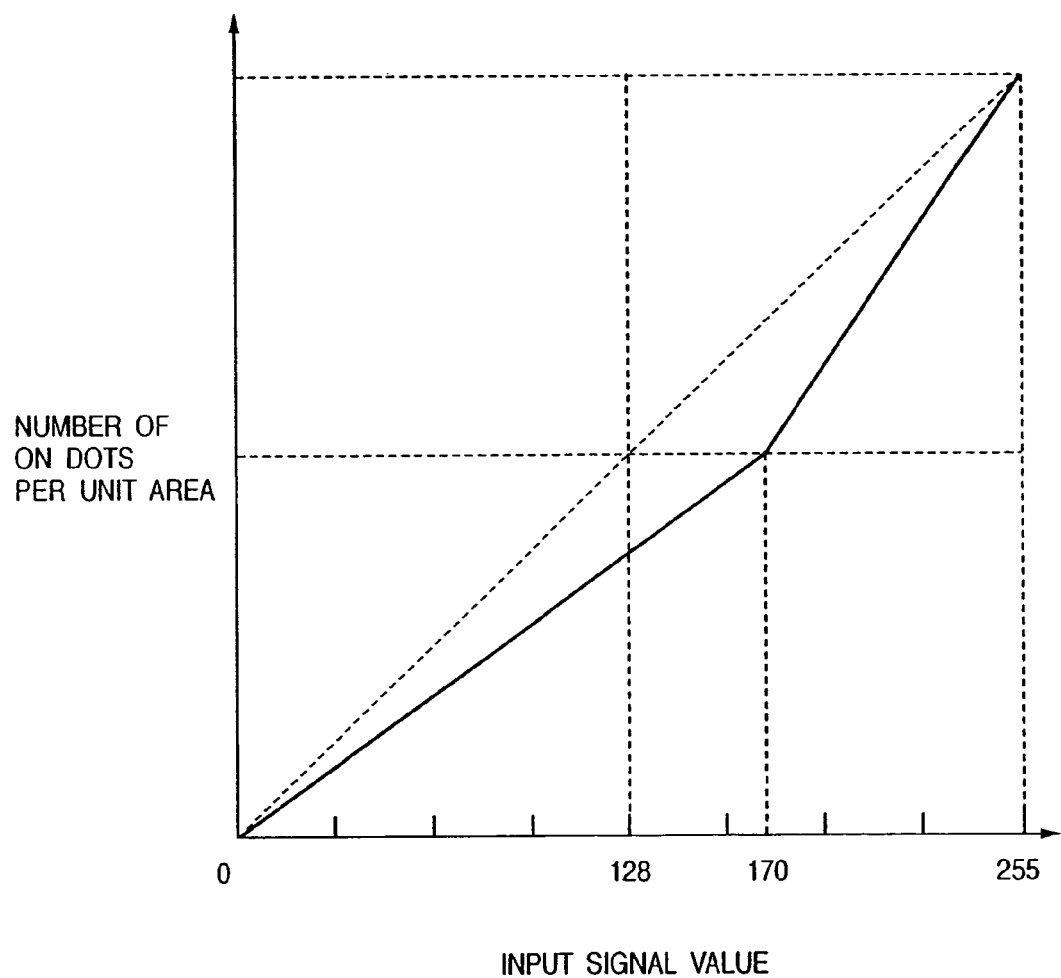
FIG. 14 is a graph showing the number of ON dots with respect to the signal value in a 600-dpi, binary pattern.

Note that the relationship between the input signal value and the number of ON dots of the printer 400 is expressed by the polygonal line shown in FIG. 14.

[Generation of Tone Correction Table]

Generation of a tone correction table for the system with the above characteristics will be explained below.

Figure 21:
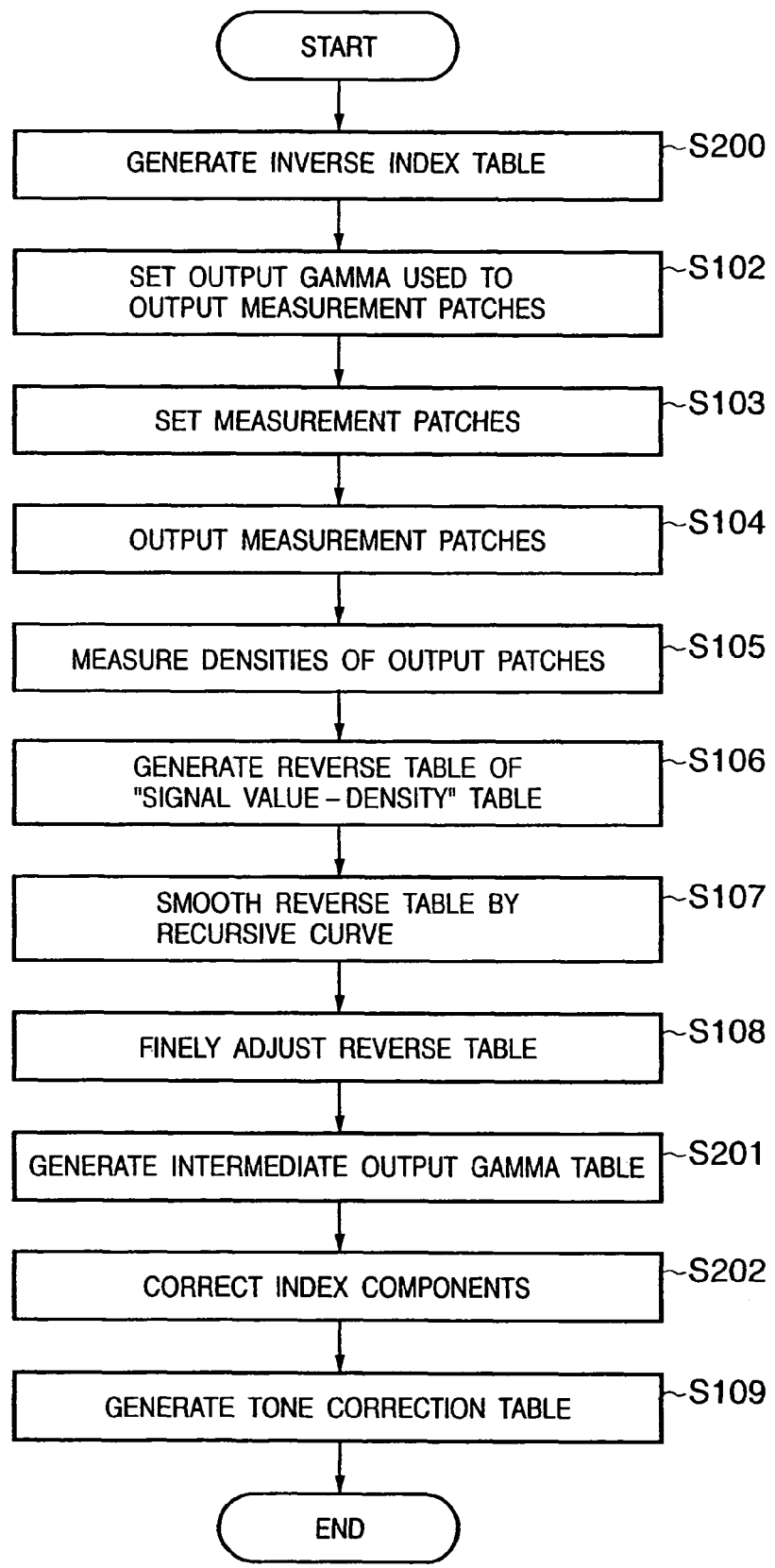
FIG. 21 is a flow chart for explaining the sequence for generating (deriving) a tone correction table.

FIG. 21 is a flow chart showing the sequence for generating (deriving) a tone correction table. When the host executes software which is provided as a part of or in association with the printer driver, a tone correction table can be generated.

Figure 8:
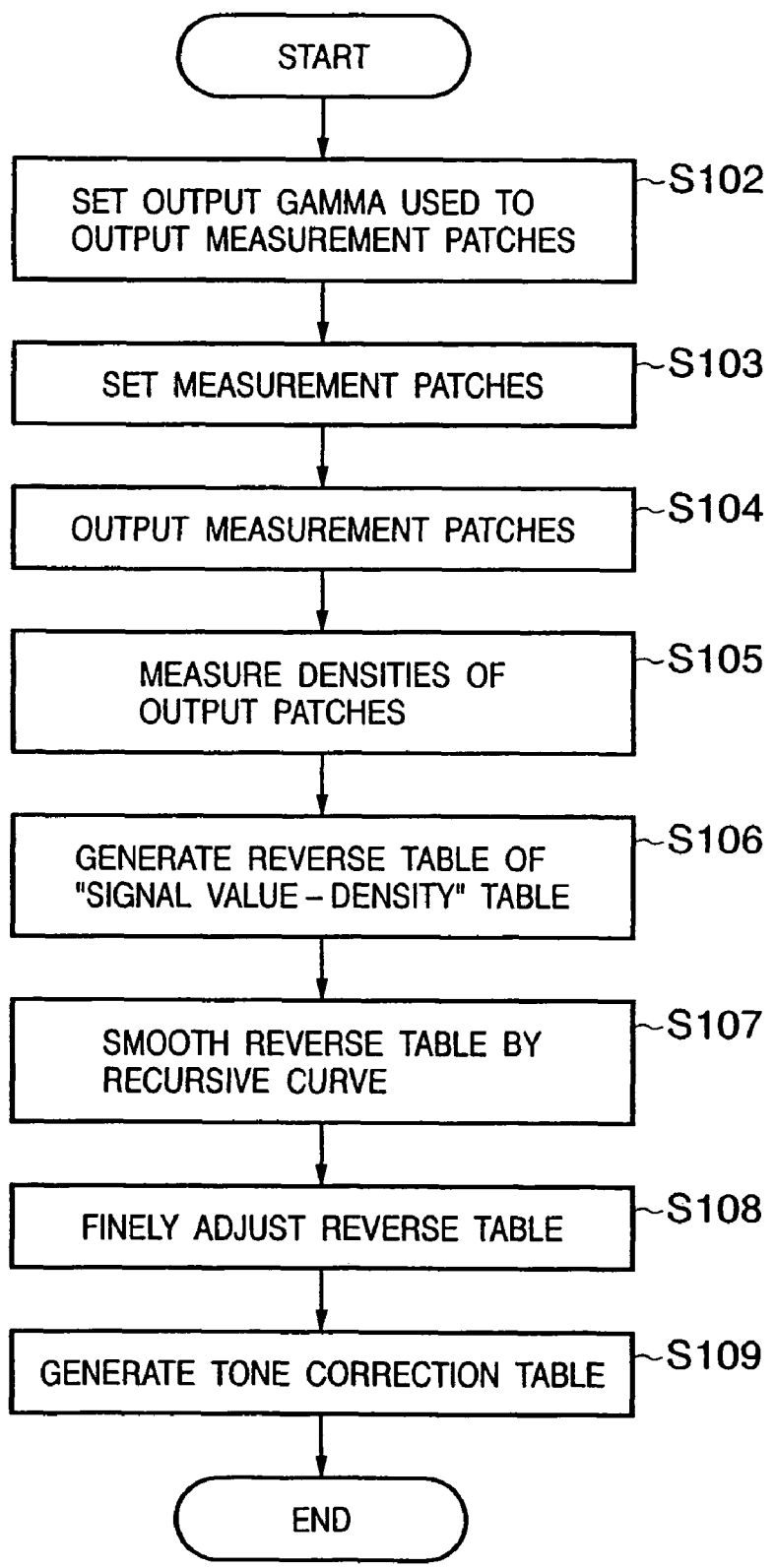
FIG. 8 is a flow chart for explaining a process for deriving a tone correction table for a 5-valued printer with an input resolution of 300 dpi.
Figure 9:
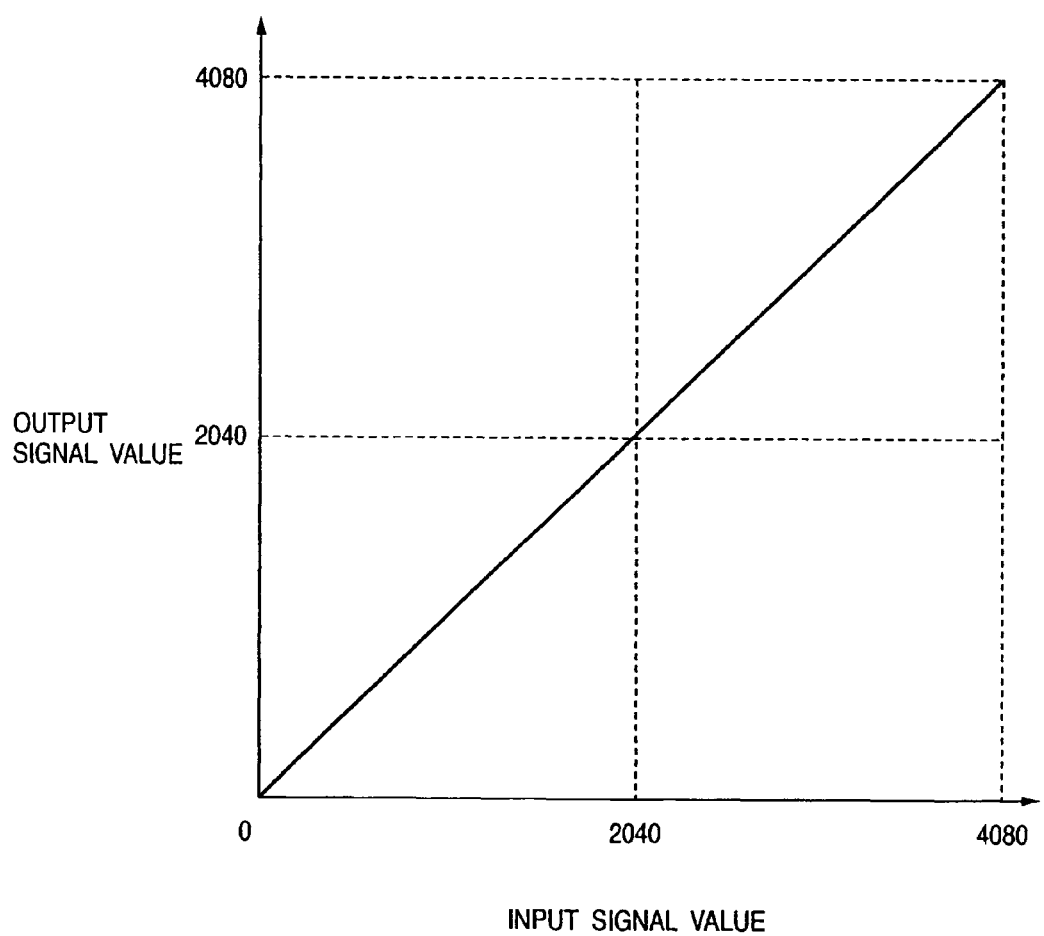
FIG. 9 is a graph showing a tone correction table which allows an input signal value to pass through it.

Compared to the processes shown in FIG. 8, the steps of generating an inverse index table (S200), generating an intermediate output gamma table (S201), and correcting index components (S202) are added to those shown in FIG. 21, as will be described in detail later. Note that the same step numbers denote the same processes as in FIG. 8, and a detailed description thereof will be omitted.

Generation Principle of Tone Correction Table

A tone correction table can be considered as an inverse function of an "Input signal value—output density" function. Therefore, an output gamma curve is generated using a curve which cancels discontinuity of index patterns, and the generated output gamma curve is calculated and converted based on the former curve, thus obtaining a tone correction table for the discontinuous index patterns.

A method of generating a tone correction table corresponding to the discontinuous index patterns will be explained using equations (2) to (6). Note that a case will be explained wherein the input/output ranges of all functions are normalized to a range from 0 to 4080 for the sake of simplicity.

$$z = o(x) \qquad (2)$$

$$x = o^{-1}(z) \qquad (3)$$

$$z = n(i(x)) \qquad (4)$$

$$n^{-1}(z) = i(x) \qquad (5)$$

$$x = i^{-1}(n^{-1}(z)) \qquad (6)$$

where x: a normalized input signal value [0, 4080]
z: a normalized output density [0, 4080]
i(•): a normalized index table (∝ ink dot quantity) input [0, 4080], output [0, 4080]

o(•): a normalized output density table with respect to the normalized input signal value input [0, 4080], output [0, 4080]

n(•): a normalized output density table with respect to the input of the normalized dot quantity input [0, 4080], output [0, 4080]

Note that the normalized input signal value x corresponds to an image input signal value, and the normalized output density z corresponds to the output density of the printer. Also, the normalized index table i(•) expresses the normalized number of ON dots (ink dot quantity) with respect to the input signal value when the index patterns of this embodiment are used. Upon calculating values i(x) over the full definition range [0, 4080] of the normalized input signal value x, a graph shown in FIG. 14 is obtained.

The normalized output density table o(•) with respect to the normalized input signal value x expresses the normalized output density with respect to the normalized input signal value when an output is made without tone correction, i.e., when an output is made while the relationship between the number of ON dots and input signal value is, as shown in FIG. 14. The normalized output density table o(•) with respect to the normalized input signal value is as shown in FIG. 15 due to the presence of the inflection point (switching point of slopes) shown in FIG. 14.

Figure 1:
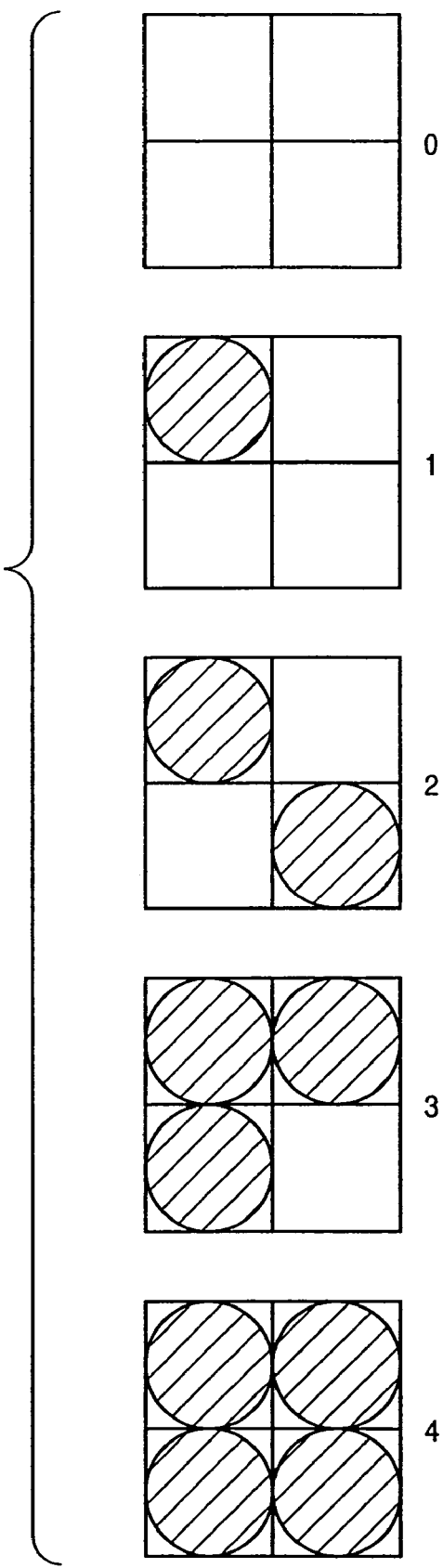
FIG. 1 is a view showing a layout method of ON dots when 2×2 binary pixels of a resolution of 600 dpi are used as one set.
Figure 2:
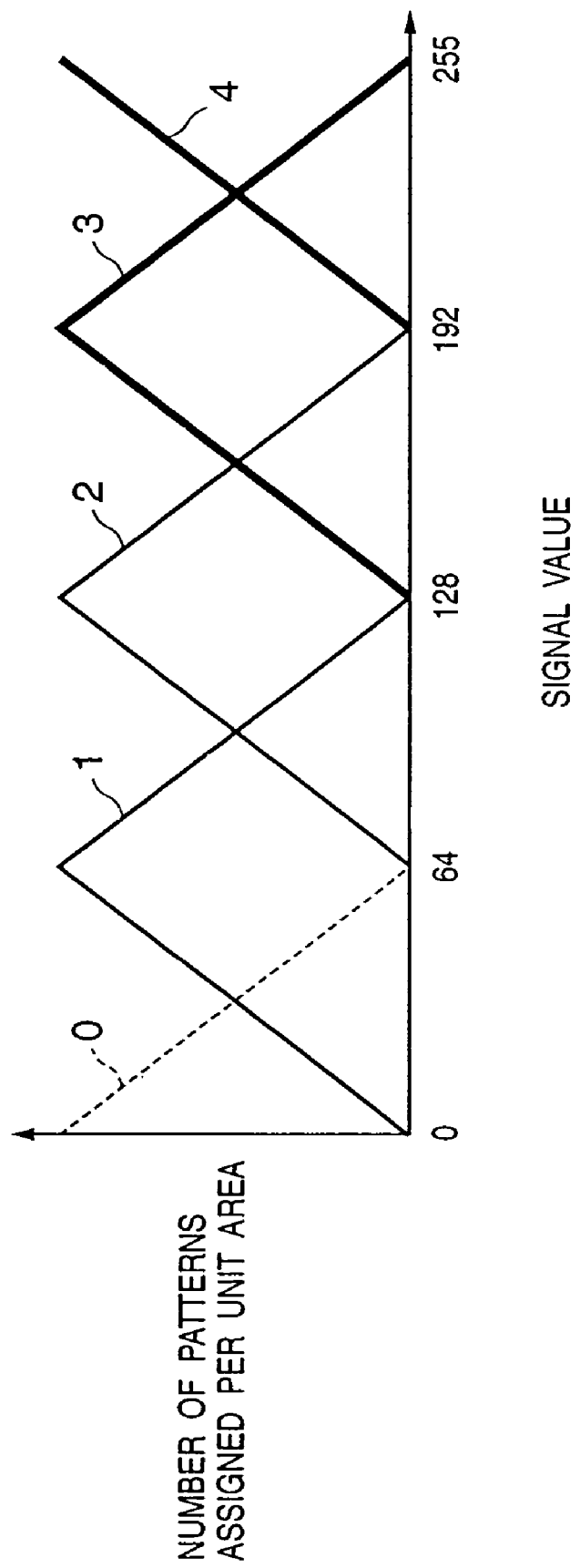
FIG. 2 is a graph showing an average distribution of the number of index patterns assigned per unit area (ordinate) with respect to the signal value of an input image signal (abscissa)
Figure 4:
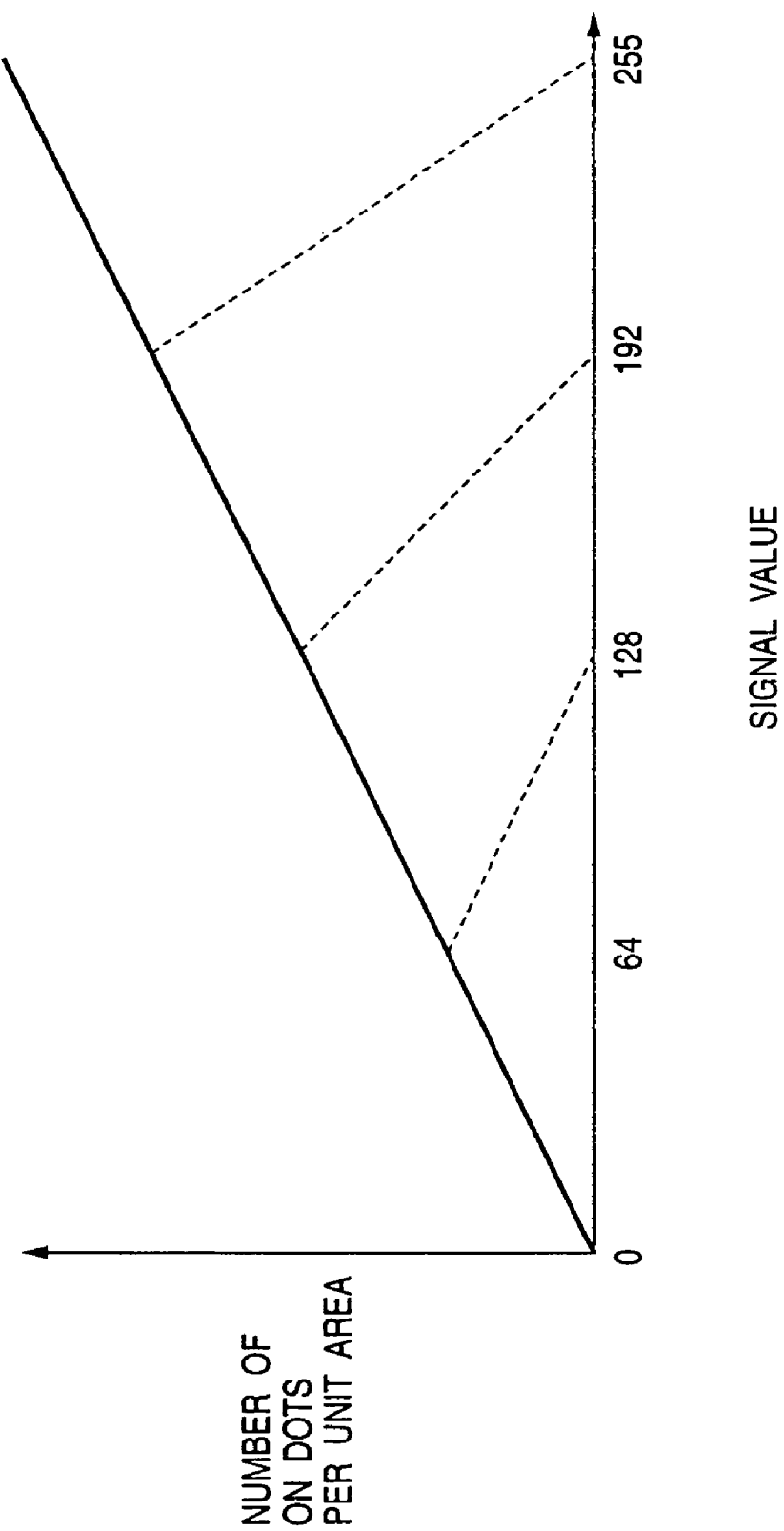
FIG. 4 is a graph showing the average number of 600-dpi, binary ON dots per unit area (ordinate) with respect to the signal value of an input image signal (abscissa)
Figure 5:
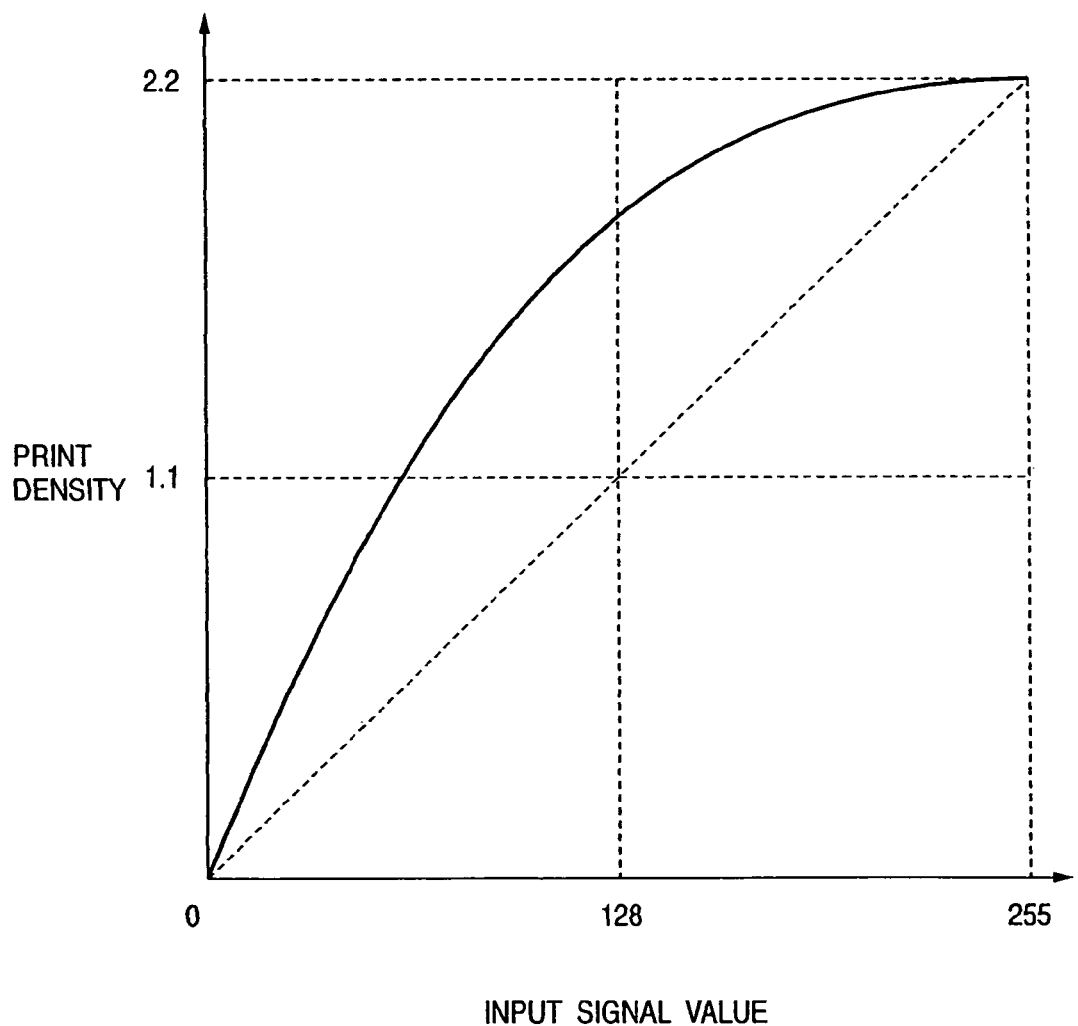
FIG. 5 is a graph showing the print density (ordinate) upon printing an input signal value (abscissa) as a 600-dpi binary pattern.
Figure 6:
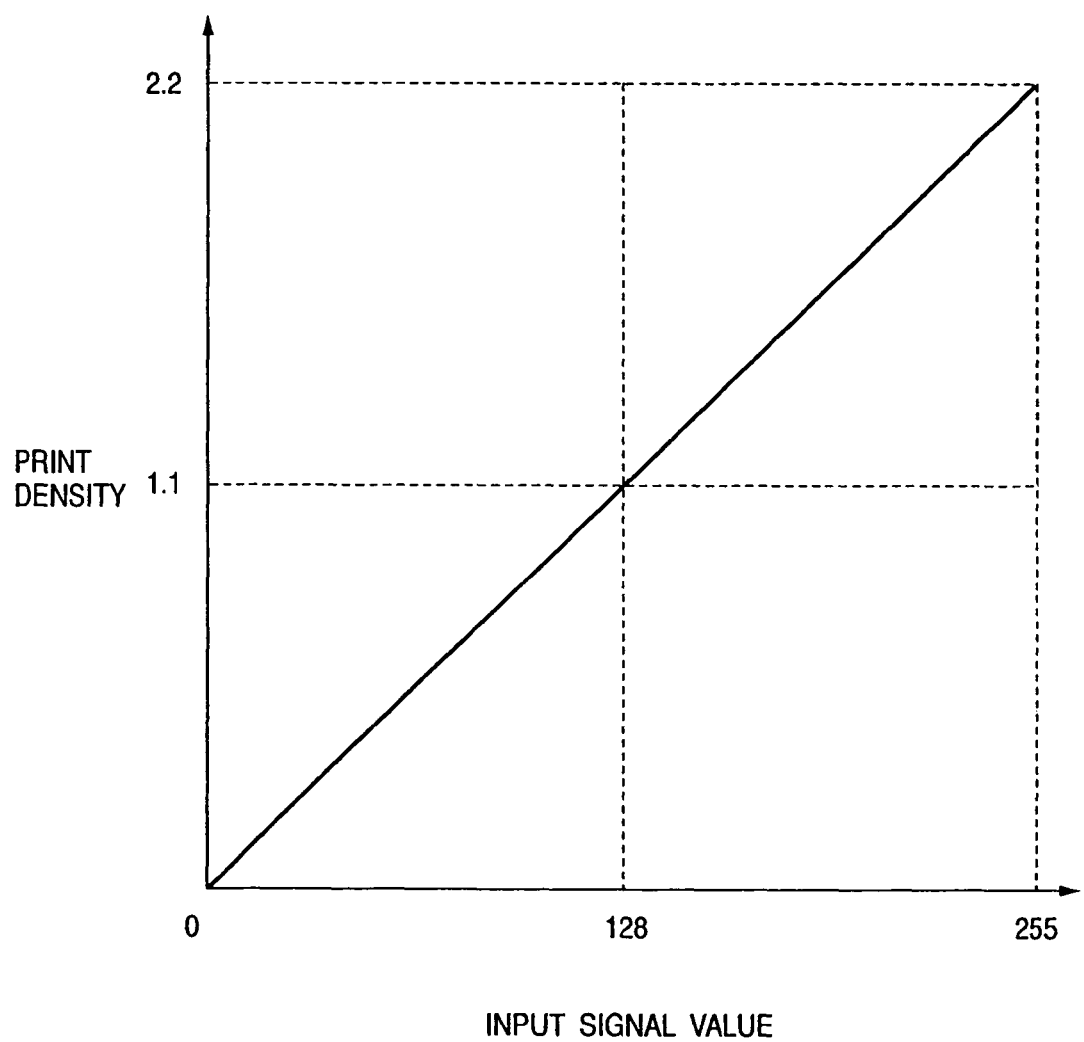
FIG. 6 is a graph showing the tone characteristics which define the linear relationship between the input signal value and print density.

The normalized output density table n(•) with respect to the normalized input signal value x expresses the normalized output density with respect to the normalized input signal value when the number of ON dots and the input signal value have a proportional relationship, as shown in FIG. 6. The normalized output density table n(•) with respect to the normalized input signal value x in this case is as shown in FIG. 5.

Figure 15:
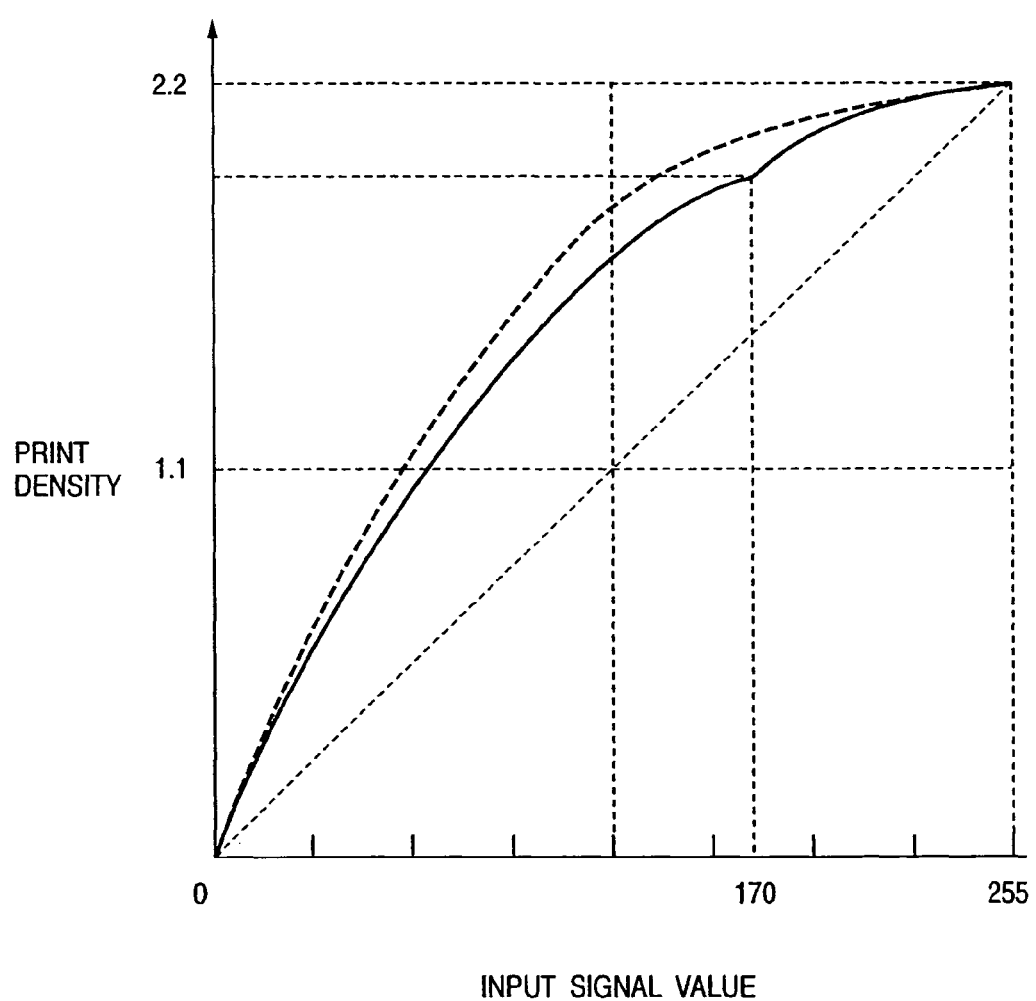
FIG. 15 is a graph showing the print density characteristics of a system in which the number of ON dots increases in a polygonal line pattern.

In this embodiment, the output density characteristics without any tone correction are given by equation (2), and are expressed as a graph, as indicated by the solid curve in FIG. 15. Therefore, a tone correction table to be obtained in this embodiment is given by equation (3) as an inverse function of equation (2), and is expressed by the bold solid curve in FIG. 16.

The conventional method of generating a tone correction table aims at a system having continuous print characteristics shown in FIG. 6. Therefore, that method can be applied to a system having output density characteristics shown in FIG. 5. This corresponds to:

$$z = n(x) \quad (7)$$

The output density characteristics (FIG. 5) of the system which uses continuous index patterns and corresponds to equation (7) represent the output density with respect to the input image signal value. At the same time, such characteristics also represent the output density with respect to the number of ON dots at 600 dpi. In the system of this embodiment, the number of ON dots with respect to the input signal value can be expressed by i(x), and has characteristics shown in FIG. 14.

Hence, the output density characteristics of this embodiment can be expressed by equation (4) using the output density characteristics n(•) of the system using continuous index patterns, and the normalized index table i(•). By modifying equation (4), a tone correction table is derived.

Figure 7:
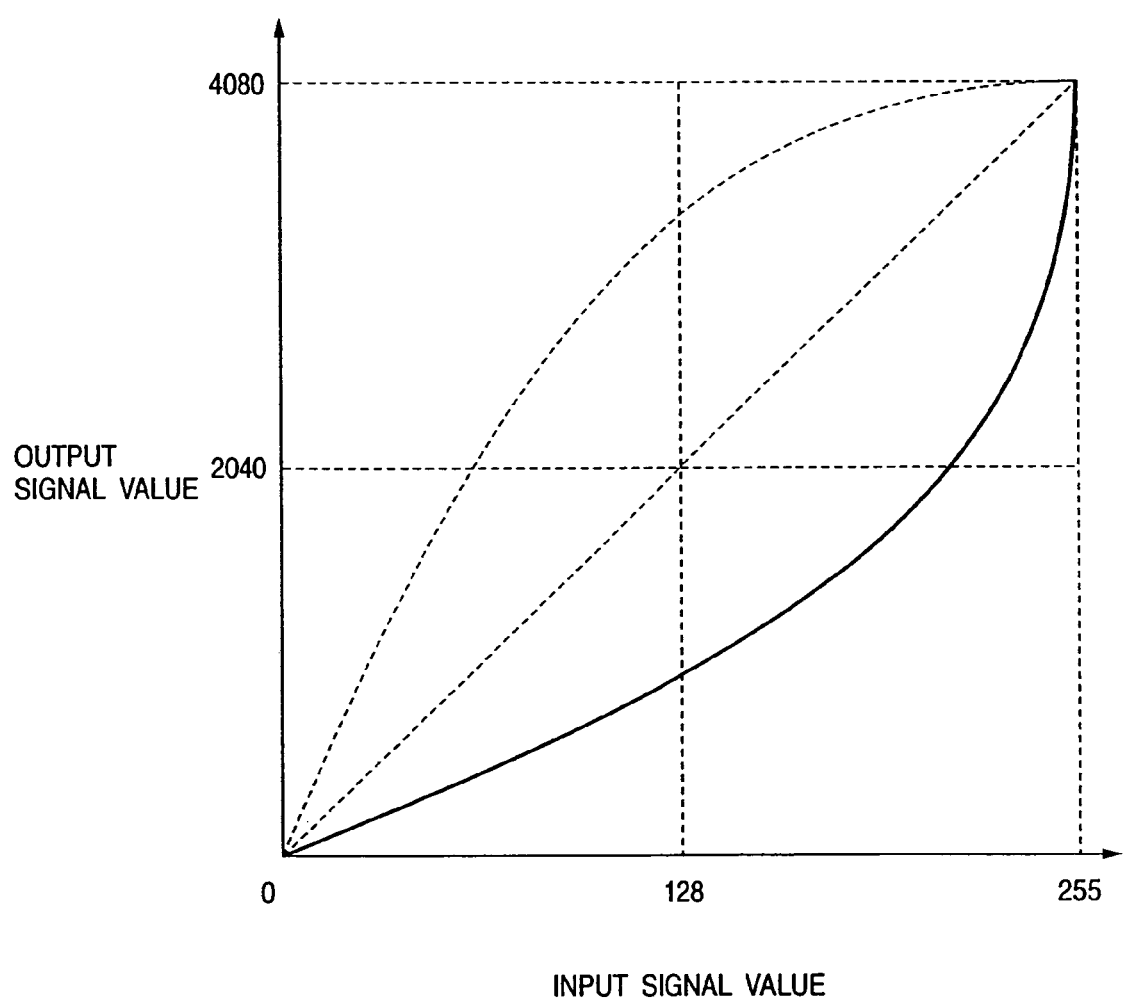
FIG. 7 is a graph showing an inverse function table for correcting the relationship between the input signal value and print characteristics.

Using the conventional method of generating a tone correction table, $n^{-1}(•)$ indicated by the solid curve in FIG. 7 is calculated, and is given to both sides of equation (4) to yield equation (5). An inverse function $i^{-1}(•)$ of i(•) is obtained, as indicated by the broken curve in FIG. 22, and is given to both sides of equation (5) to yield equation (6).

On the other hand, as can be seen from equation (3) as a conventional tone correction table, the tone correction table can be defined to have the normalized output density z as an input and the normalized input signal value x as an output. Upon examining equation (6) based on this fact, $i^{-1}(n^{-1}(•))$ defines a tone correction table of this embodiment.

In order to calculate the output density characteristics n(•) of the system using continuous index patterns in the system using discontinuous index patterns like in this embodiment, patches may be output using the inverse function $i^{-1}(•)$ of i(•) in place of the tone correction table, and the densities of the output patches may be measured.

The processes unique to this embodiment shown in the flow chart of FIG. 21 will be explained below.

Inverse Index Table (S200)

Figure 22:
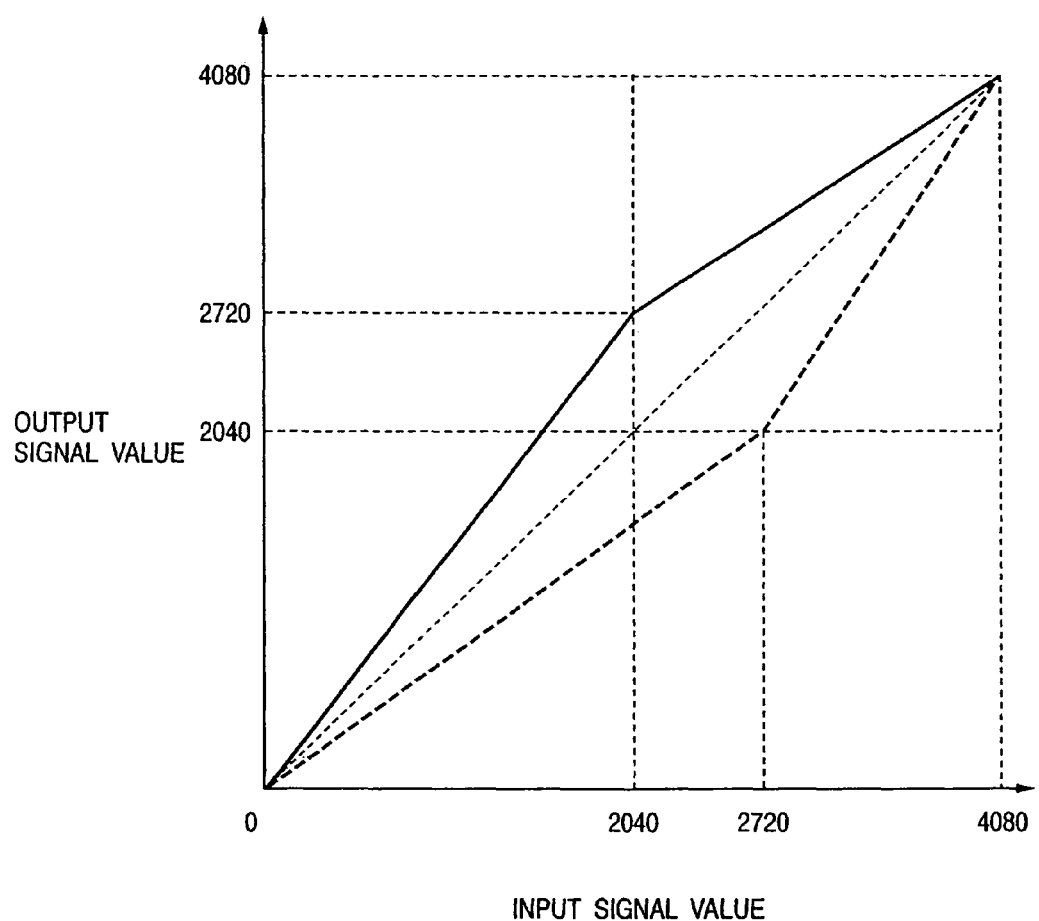
FIG. 22 is a graph showing an inverse index table.

An inverse index table indicated by the solid curve in FIG. 22 is an inverse function (broken curve) of a table of the number of ON dots with respect to the input signal value when discontinuous index patterns are used. As shown in FIG. 22, since this table can be easily generated, a detailed description of the generation method will be omitted.

That is, in order to obtain the output density characteristics n(•) of the system using continuous index patterns, an inverse index table is generated (S200), and is set as a tone correction table upon outputting measurement patches (S102).

By outputting patches using the inverse index table, the output of the number of ON dots, which is linear to the input image signal value, as shown in FIG. 6, can be obtained after multi-valued→binary conversion (rasterize index patterns) by the printer 400. In other words, using the inverse index table, the number of ON dots can be linear to the input image signal value, and even when patches (FIG. 10) sampled at appropriate intervals are used, a sampling error of a density characteristic switching point shown in FIG. 17 can be prevented.

If sampled patches can be used, highly reliable print density characteristics can be obtained while suppressing the influences of variations of the ejection amount due to the temperature rise of the print head even in a system in which the density reproduction characteristics on a single sheet or between different sheets are unstable. Of course, many processes in the conventional generation method of a tone correction table can be used in generation of a tone correction table in a system with nonlinear print characteristics like in the printer 400 of this embodiment. More specifically, the same processes as those in the conventional generation method of a tone correction table are executed in steps S102 to S108 in FIG. 21.

Generation of Intermediate Output Gamma Table (S201)

Both the input and output of the input/output range [0, 1] of the reverse table finely adjusted by the process in step S108 are adjusted to [0, 4080], thus obtaining $n^{-1}(•)$ called an "intermediate output gamma table" in this embodiment.

Correction of Index Components (S203)

As can be seen from comparison between equations (3) and (6), a tone correction table $o^{-1}(•)$ to be obtained is equivalent to $i^{-1}(n^{-1}(•))$, as described above, Hence, by synthesizing $i^{-1}(•)$ and $n^{-1}(•)$, $o^{-1}(•)$ is obtained.

That is, output values are examined by referring to $n^{-1}(•)$ shown in FIG. 7 for all input values within the input range [0, 255]. These output values are input to the inverse index table $i^{-1}(•)$ indicated by the solid curve in FIG. 22, thus obtaining the synthesis output values $i^{-1}(n^{-1}(•))$ of the table. In other words, in step S202 the tone correction table $n^{-1}(•)$ having no inflection point shown in FIG. 7 is mathematically converted to calculate the tone correction table with the inflection point, indicated by the bold solid curve in FIG. 16.

By calculating the discontinuous inflection point of the tone correction table by mathematical conversion, "deviation of the inflection point" explained as a problem can be prevented.

Figure 16:
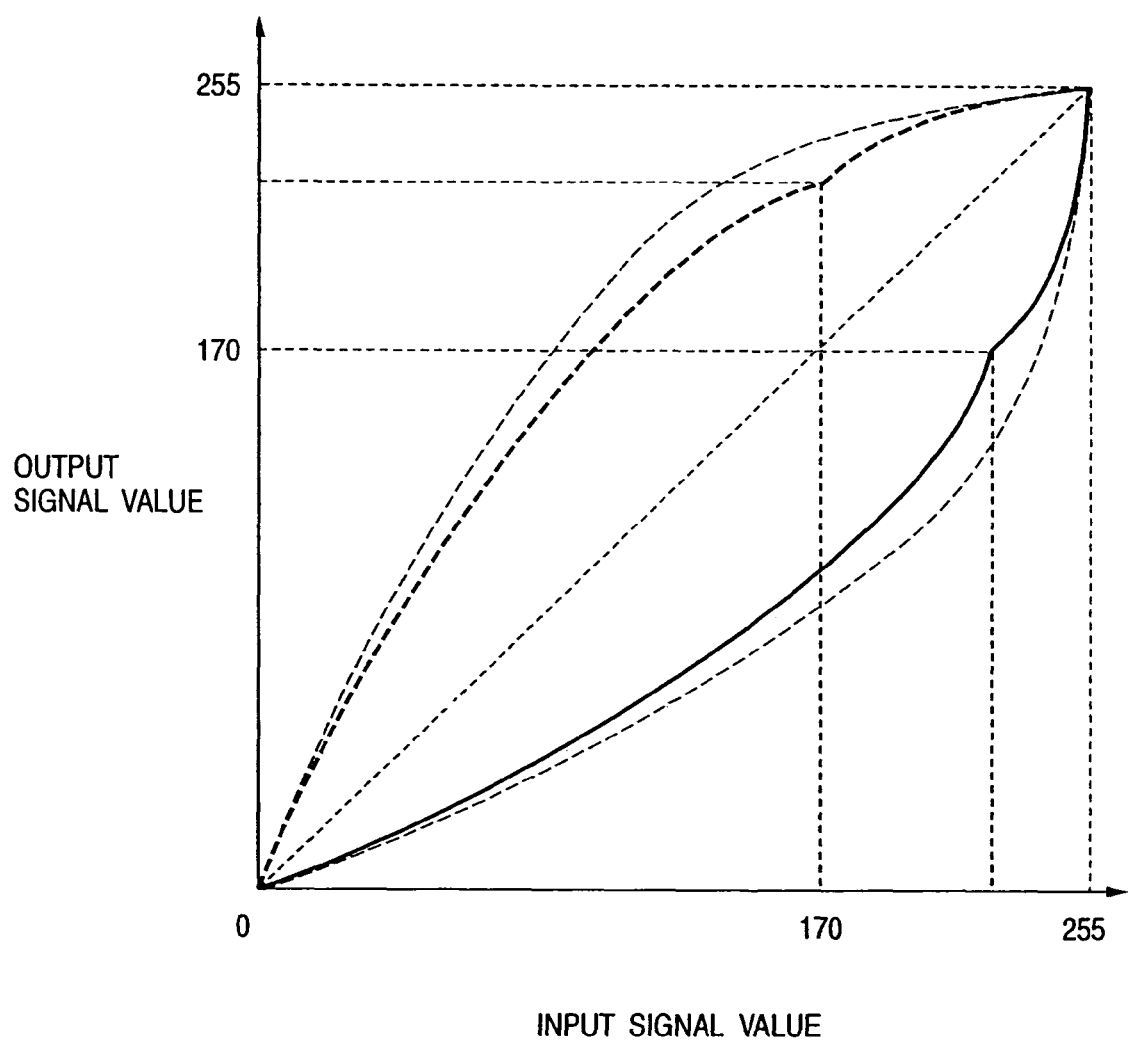
FIG. 16 is a graph showing a tone correction table required for the system in which the number of ON dots increases in a polygonal line pattern.

The synthetic output values $i^{-1}(n^{-i}(\bullet))$ for respective input image signal values calculated in the aforementioned sequence are converted into a table, and that table is substituted in a sequence for the tone correction table $o^{-1}(\bullet)$, thus obtaining a tone correction table (output gamma table) indicated by the bold solid curve in FIG. 16 (S109).

Note that the obtained tone correction table is set in the tone correction unit 302 of the printer driver 300.

Second Embodiment

An image processing apparatus according to the second embodiment of the present invention will be described below. Note that the same reference numerals in this embodiment denote the same parts as those in the first embodiment, and a detailed description thereof will be omitted.

The processing sequence in the second embodiment is substantially the same as that in FIG. 8, and differences will be explained below.

Set Measurement Patches (S103)

Figure 10:
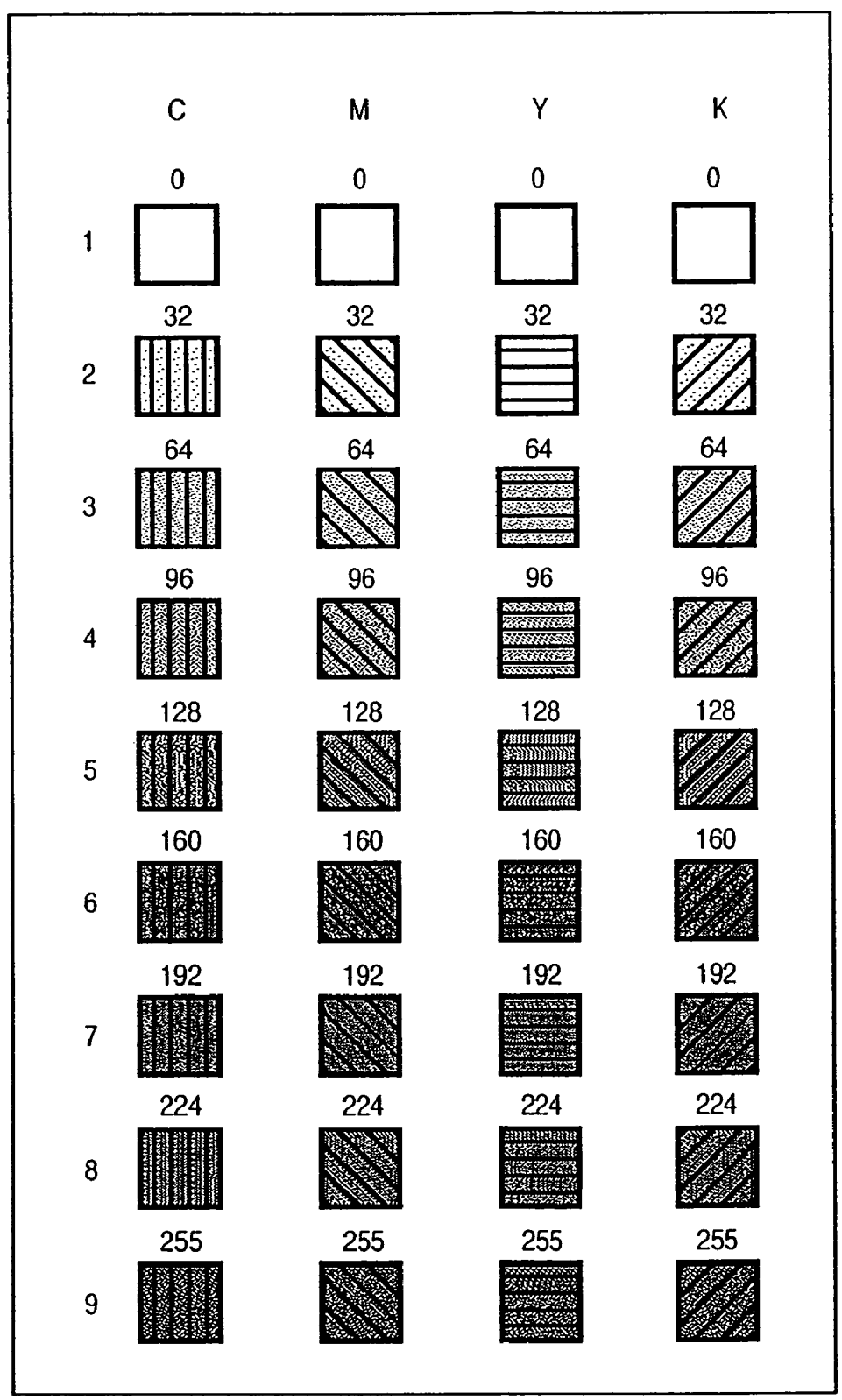
FIG. 10 shows measurement patches.
Figure 11:
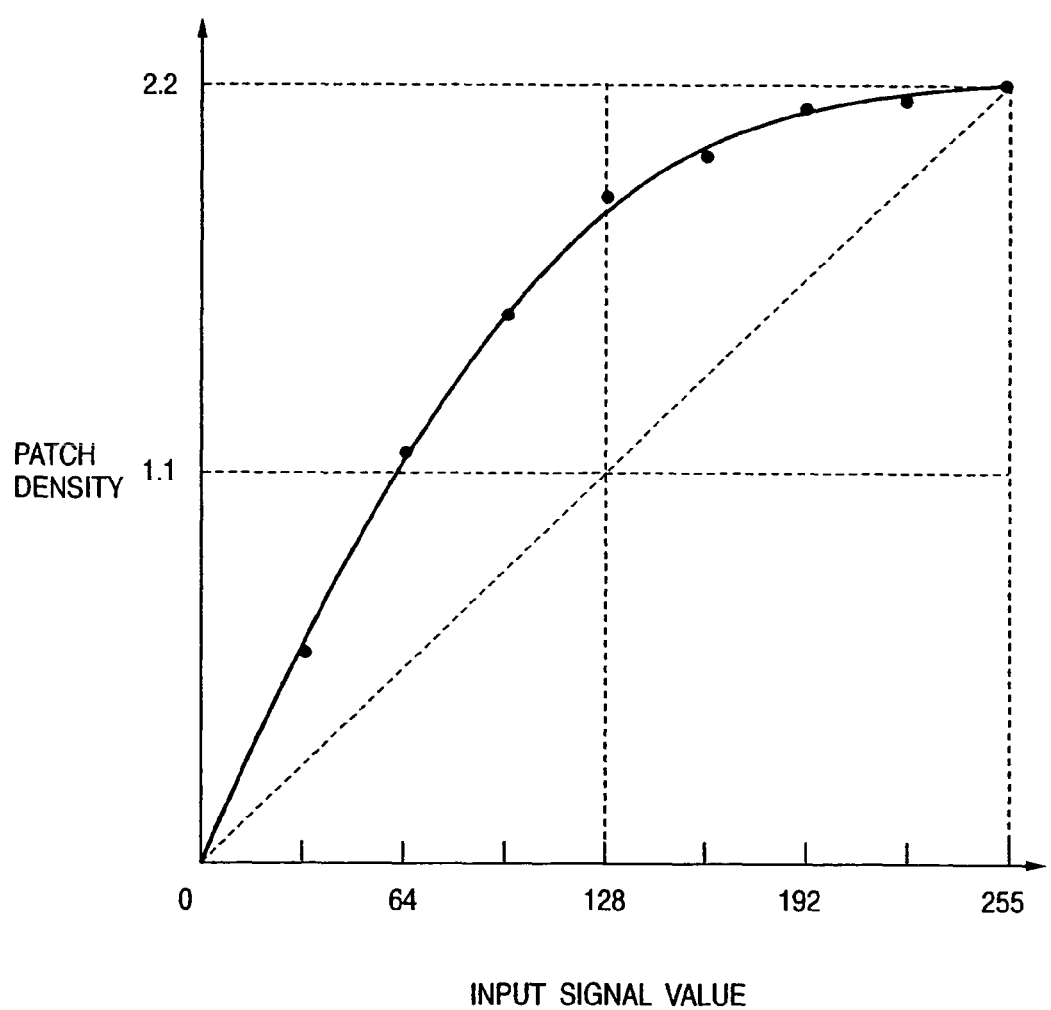
FIG. 11 is a graph showing a "signal value—density" table.
Figure 23:
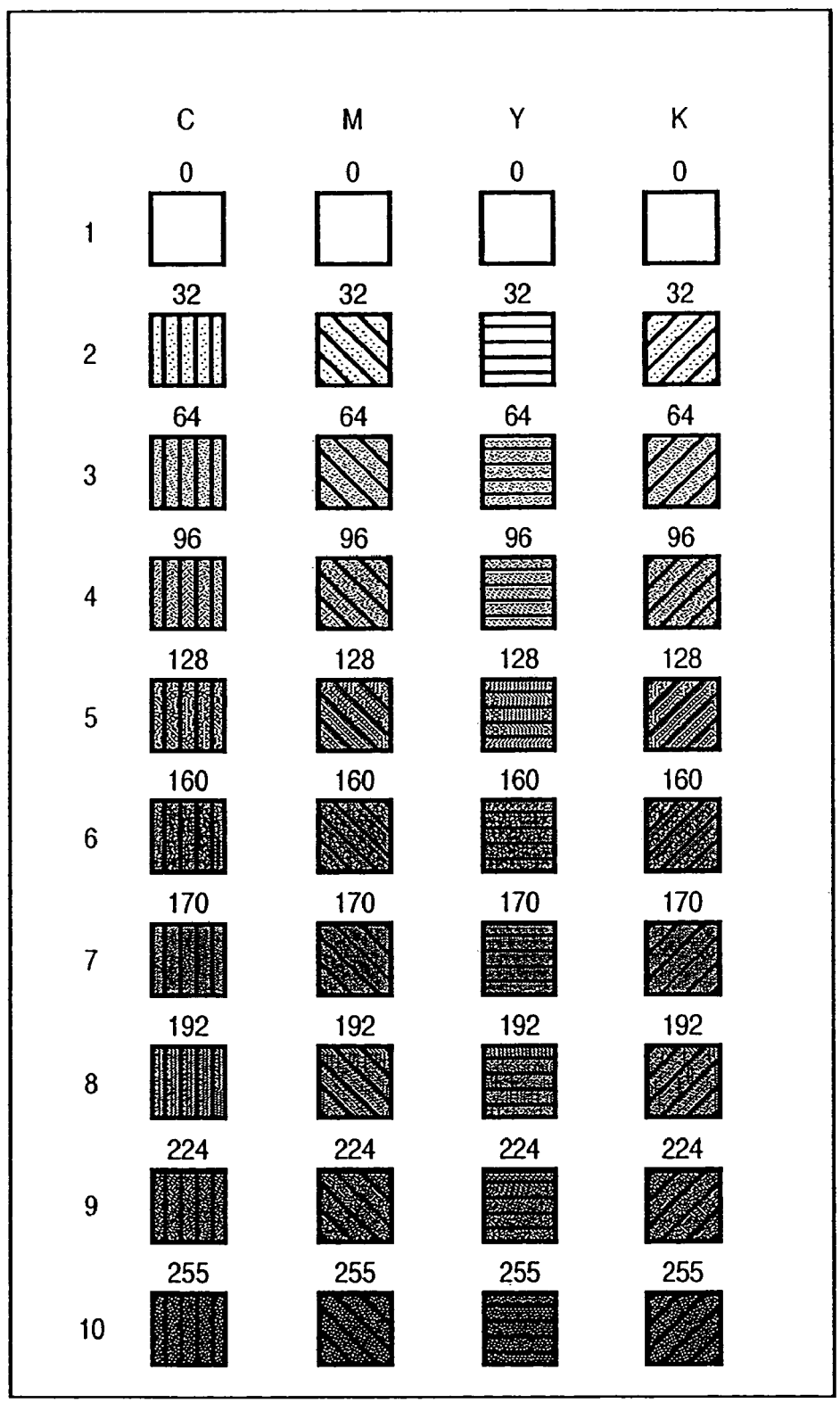
FIG. 23 shows measurement patches to which patches of a signal value corresponding to the switching point of index patterns are added.

When the sampled patches shown in FIG. 10 are used, a problem is posed at the inflection point of the tone correction table which is caused by switching of index patterns. To solve this problem, the second embodiment sets patches which include those of a signal value corresponding to the index pattern switching point as measurement patches, as shown in FIG. 23.

Smoothing of Reverse Table Using Recursive Curve (S107)

In the second embodiment, the output density plots always include the index pattern switching point since the patches of a signal value corresponding to the index pattern switching point are added. However, if the reverse table is smoothed using the recursive curve by the conventional method, this switching point may not be smoothed. Hence, in the second embodiment, the output density plots are divided into regions on the right and left sides of the switching point to set recursive curves, thereby smoothing the reverse table.

Fine Adjustment of Reverse Table (S108)

The reverse table is finely adjusted to adjust any deviation due to oscillations of the recursive curve and that of the end point of the tone correction table.

In the second embodiment, since the recursive curves are set by dividing the output density plots into two regions to smooth the reverse table, another deviation occurs at the index pattern switching point as the boundary of the two recursive curves. Therefore, in the second embodiment, a deviation of the switching point as the boundary of the two recursive curves is adjusted in addition to the aforementioned adjustment of deviations.

As described above, according to the above embodiments, a tone correction table which can accurately correct tone characteristics and can obtain linear output characteristics in a system in which the output of a print medium is discontinuous with respect to an input signal value can be generated.

Also, the method of generating a tone correction table which can compensate for discontinuous output characteristics to obtain linear output characteristics in a printing apparatus having discontinuous output characteristics can be provided.

Furthermore, the method of generating a tone correction table which can use an identical measurement patch format independently of printer specifications while reducing the number of measurement patches to be printed upon generating a tone correction table, allows processes by simple arithmetic operations, and can easily attain accurate, faithful halftone reproduction can be provided.

The above embodiments adopt the method of smoothing data using a recursive curve after an inverse table of an input signal value—output density table is calculated unlike in Japanese Patent Publication No. 8-2659. However, a tone correction table may be obtained using a method of calculating an inverse table after data of an input signal value—output density table are smoothed, as in Japanese Patent Publication No. 8-2659.

In the above example, combinations of dots which have the same size and correspond to an identical ink type are used as index patterns. However, in case of a printer which can selectively print small and large dots, combinations of small and large dots may be used as index patterns. Also, in case of a printer which uses two types of inks, i.e., light and dark inks, combinations of light and dark dots may be used as index patterns. In these cases, the method of generating a tone correction table of the above embodiment can be applied.

Furthermore, in the above example, the number of inflection points of the print density curve caused by switching of index patterns is one. However, the number of inflection points is not limited to one, and the method of generating a tone correction table of the above embodiment can be applied to a system having two or more inflection points.

Of course, the method of generating a correction table of this embodiment is not limited to an ink-jet printer using discontinuous index patterns, and can be widely applied to various other printing apparatuses which have discontinuous output characteristics with respect to input characteristics (e.g., a CRT hard copy apparatus).

Third Embodiment

An image processing apparatus according to the third embodiment of the present invention will be described below. Note that the same reference numerals in this embodiment denote the same parts as those in the first embodiment, and a detailed description thereof will be omitted.

[Problem in Tone Correction Table Generation By Above Method]

Figure 28:
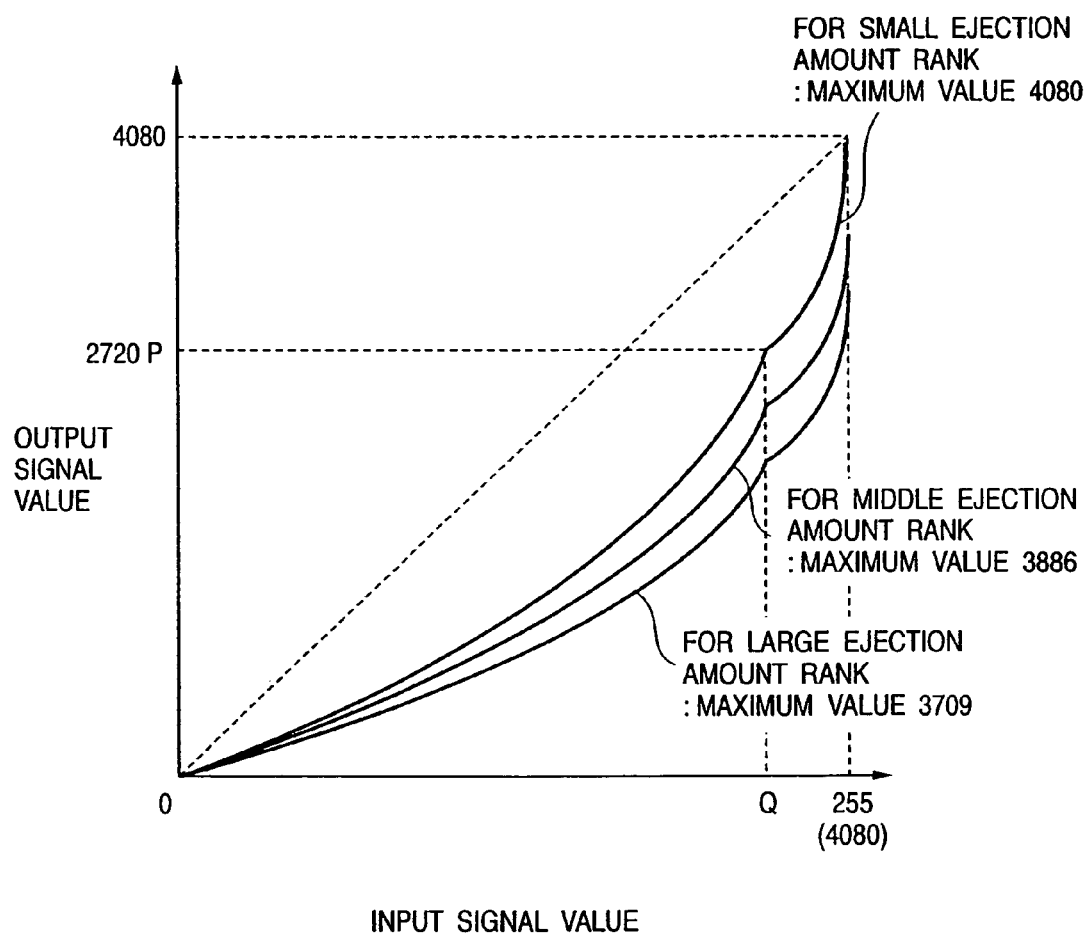
FIGS. 28 and 29 are graphs for explaining the method of generating a tone correction table.

When a tone correction table whose maximum value corresponds to point P in FIG. 28 and is smaller than a full-range value (4080 in, e.g., a table of a 12-bit output) is to be generated by the method shown in FIG. 21 for a multi-valued printer using discontinuous index patterns, a tone correction table which has a desired maximum value (point P in FIG. 28) and can define linear output density characteristics after tone correction cannot be obtained.

Figure 29:
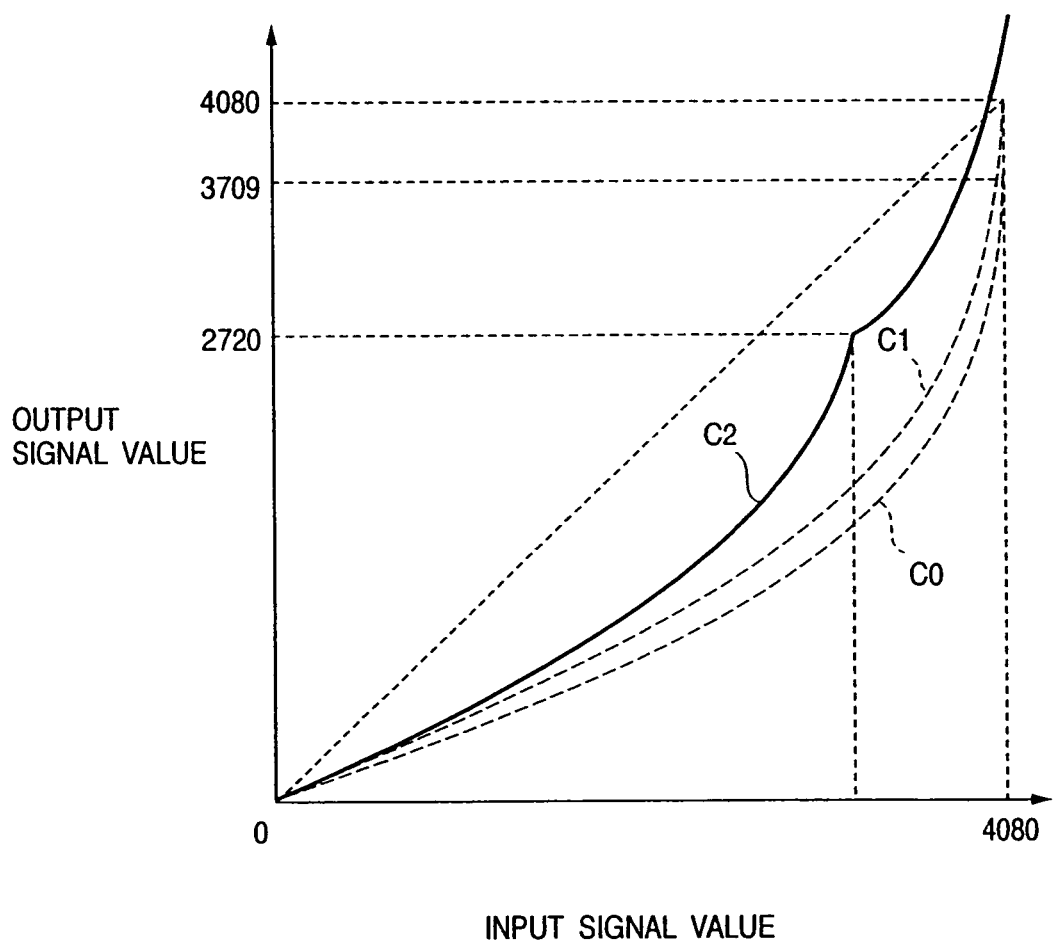

More specifically, a full-range tone correction table is indicated by broken curve C1 in FIG. 29, while a tone correction table which is obtained by a method of deriving a tone correction table having an arbitrary maximum value for a printing apparatus having linear output characteristics, and has a desired maximum value is indicated by two-dashed chain curve C0. Hence, a tone correction table which compensates for nonlinearity of the printer to obtain linear output density characteristics cannot be obtained.

When a tone correction table having a desired maximum value is generated by a conversion method of a tone correction table by, e.g., simple variable scaling on the basis of a tone correction table corresponding to nonlinearity of a printer, a tone correction table shown in FIG. 28 is obtained.

Figure 30:
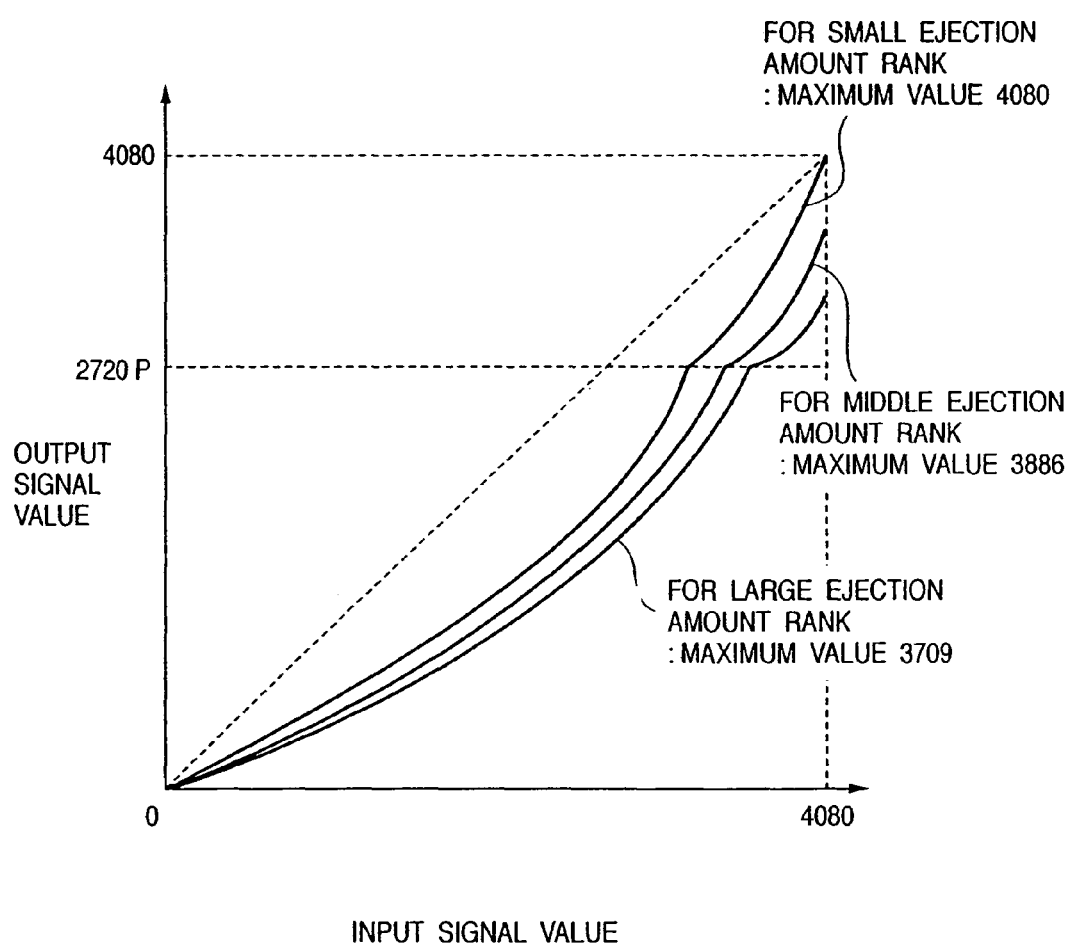
FIG. 30 is a graph showing a required tone correction table.

Hence, a required tone correction table shown in FIG. 30 cannot be obtained, and the tone characteristics after tone correction are worsened.

More specifically, tone correction tables for the large and small ejection amount ranks, which are obtained by the aforementioned method on the basis of a tone correction table for a print head of the middle ejection amount rank shown in FIG. 28, are as shown in FIG. 28, and the inflection points of the tone correction tables used to compensate for the printer output characteristics are located on the extension of point Q on the x-axis. However, when a printer having the output characteristics shown in FIG. 14 makes output, the inflection points of the tone correction tables for the large and small ejection amount ranks must be located on the extension of point P on the y-axis, as shown in FIG. 30, so as to obtain linear output density characteristics.

Furthermore, in the tone correction table generation method for the aforementioned system which uses discontinuous index patterns and has nonlinear output characteristics, when an intermediate output gamma table undergoes maximum value adjustment and then index component correction to convert a tone correction table indicated by two-dashed chain curve C0 in FIG. 29, a tone correction table indicated by solid curve C2 is obtained. However, tone correction table C2 has a maximum value different from the desired maximum value.

[Solutions]

The following three solutions may be used to solve the aforementioned problem:

(1) Tone correction tables are generated on the basis of the output density data of a printer for respective tone correction tables having different maximum values.

(2) Tone correction tables having different maximum values are obtained by analytic conversion on the basis of one intermediate output gamma table.

(3) Conversion is made based on one tone correction table to analytically obtain a tone correction table having an arbitrary maximum value.

These three solutions will be described below in turn as the third embodiment.

The third embodiment will exemplify a case wherein an ink-jet printer which prints binary data at an output resolution of 600 dpi uses 300-dpi, 4-valued index patterns shown in FIG. 12, which correspond to a super pixel of 600-dpi, 2×2 pixels, and a host performs tone correction while considering that ink-jet printer as a multi-valued (4-valued) printer with an input resolution of 300 dpi.

Figure 24:
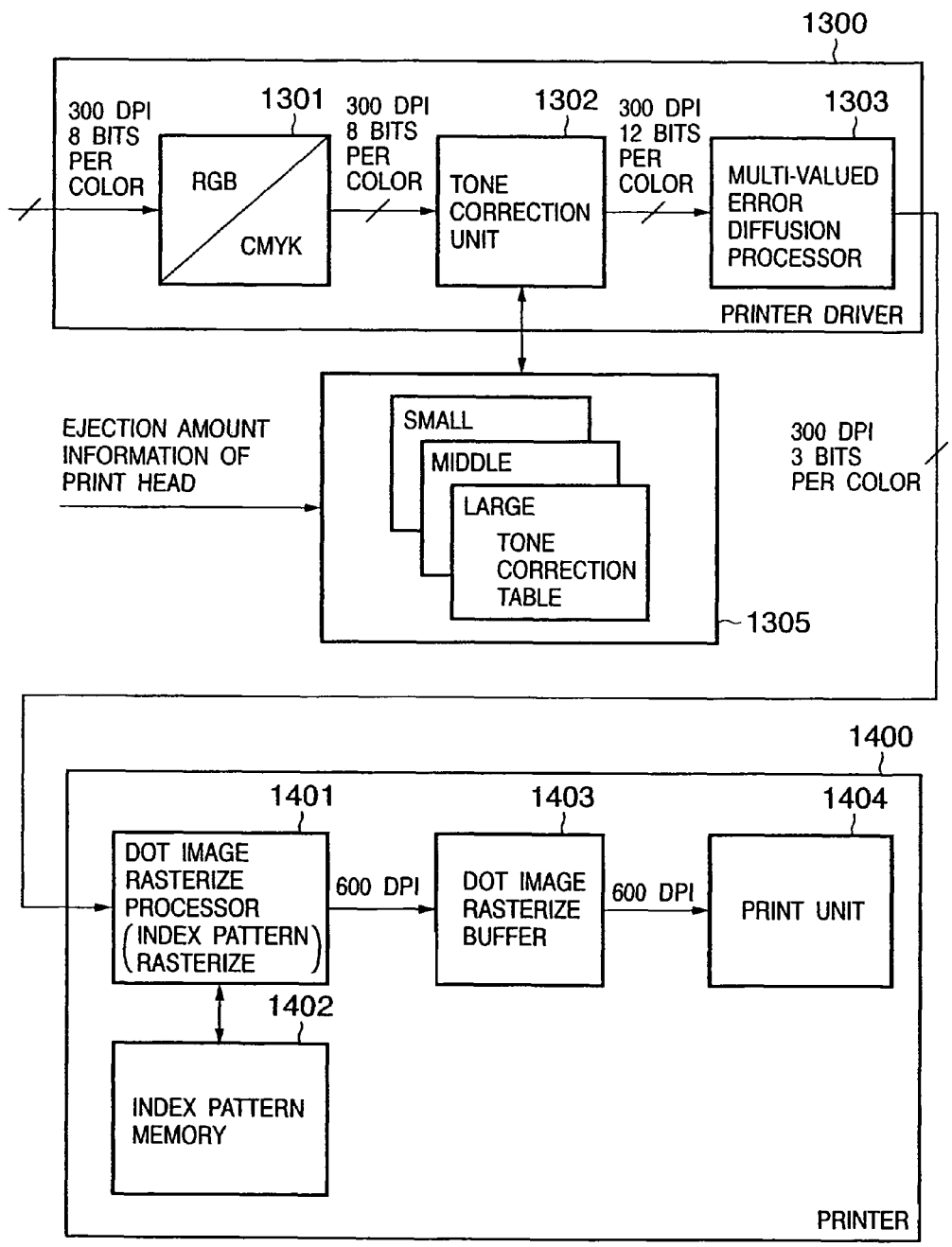
FIG. 24 is a block diagram showing the arrangement of a printer driver (color processing unit) which runs on a host, and an ink-jet printer.
Figure 25:
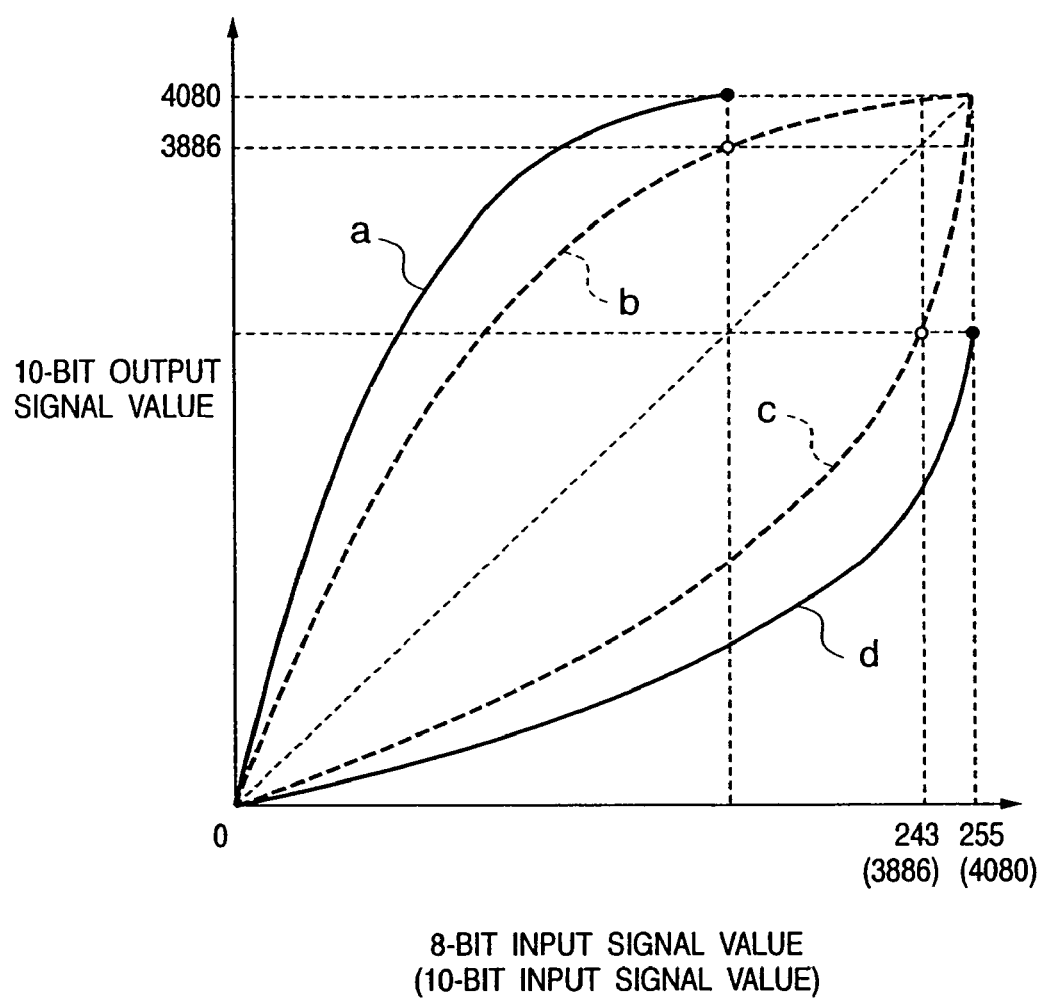
FIG. 25 is a graph showing the input/output characteristics of a printer in which the maximum value of a 12-bit tone correction table is "4080"

Note that the arrangement of a printer driver 1300 (color processing unit) which runs on the host and the ink-jet printer 1400 are the same as that shown in FIG. 24, and a detailed description thereof will be omitted. Also, the relationship between the input image signal value and the number of ON dots of the printer 1400 is expressed by a nonlinear polygonal line, as shown in FIG. 14.

A method of generating a tone correction table for a system having the output characteristics shown in FIG. 12 will be described below.

Figure 31:
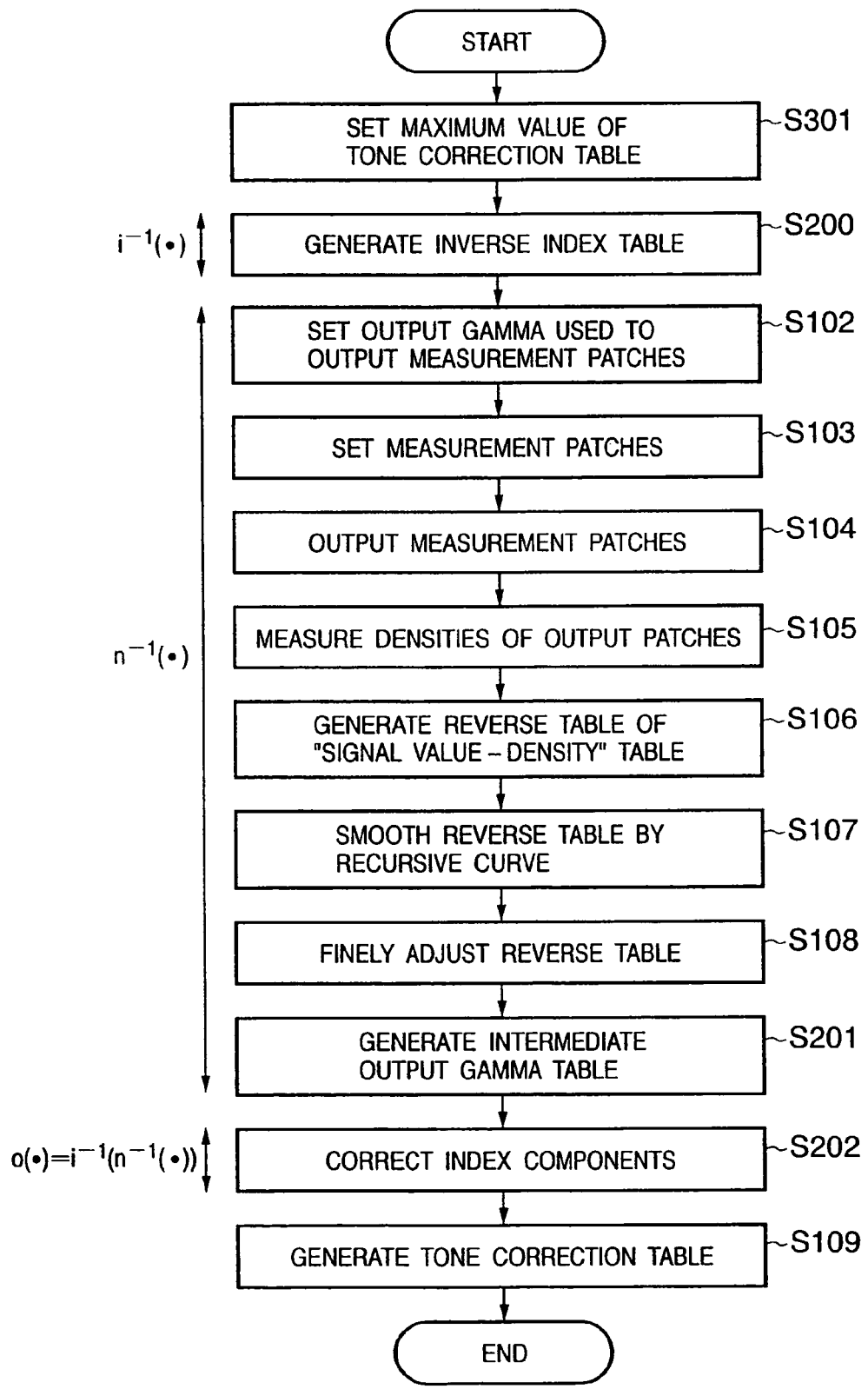
FIG. 31 is a flow chart showing the sequence for generating a tone correction table in the third embodiment.

FIG. 31 is a flow chart showing the sequence for generating (deriving) a tone correction table of the third embodiment. When the host executes software which is provided as a part of or in association with the printer driver, a tone correction table can be generated.

Compared to the processes shown in FIG. 21, the step of setting a maximum value of a tone correction table (S301) is added to those shown in FIG. 21, as will be described in detail later. Note that the same step numbers denote the same processes as in FIGS. 8 and 21, and a detailed description thereof will be omitted.

Setup of Maximum Value of Tone Correction Table (S301).

The maximum value of a tone correction table to be obtained is set. In this case, since a tone correction table for a print head of the middle ejection amount rank is to be obtained, "3886" (see FIG. 28) is set as the maximum value of the correction table.

Setup of Output Gamma for Outputting Measurement Patches (S102)

In order to calculate the output density characteristics n(•) in a system using continuous index patterns using equation (1), an inverse index table generated in step S200 is set as a tone correction table used to output measurement patches. By outputting patches using the inverse index table, the output of the number of ON dots, which is linear to the input image signal value, as shown in FIG. 6, can be obtained after multi-valued→binary conversion (rasterize index patterns) by the printer 1400.

By printing patches using the inverse index table in this way, the number of ON dots can be linear to the input image signal value, and even when patches (FIG. 10) sampled at appropriate intervals are used, a sampling error of a density characteristic switching point shown in FIG. 17 can be prevented. Since arbitrary sampling is allowed, highly reliable print density characteristics can be obtained even in a system in which the density reproduction characteristics on a single sheet or between different sheets are unstable like an in-jet printer. Furthermore, many processes in the conventional generation method can be used upon generating a tone correction table in a system with nonlinear print characteristics.

Generation of Intermediate Output Gamma Table (S201)

The input and output of the input/output range [0,1] of the reverse table finely-adjusted by the process in step S108 are respectively adjusted to [0, 4080] and [0, 3886].

Correction of Index Components (S202)

As in the above description, a process for adding nonlinearity of the printer input/output characteristics to the intermediate output gamma table obtained by removing the nonlinearity of the printer input/output characteristics is executed. A table used in conversion of a tone correction table in index component correction as a characteristic feature of the third embodiment will be explained below with reference to FIG. 32.

Figure 32:
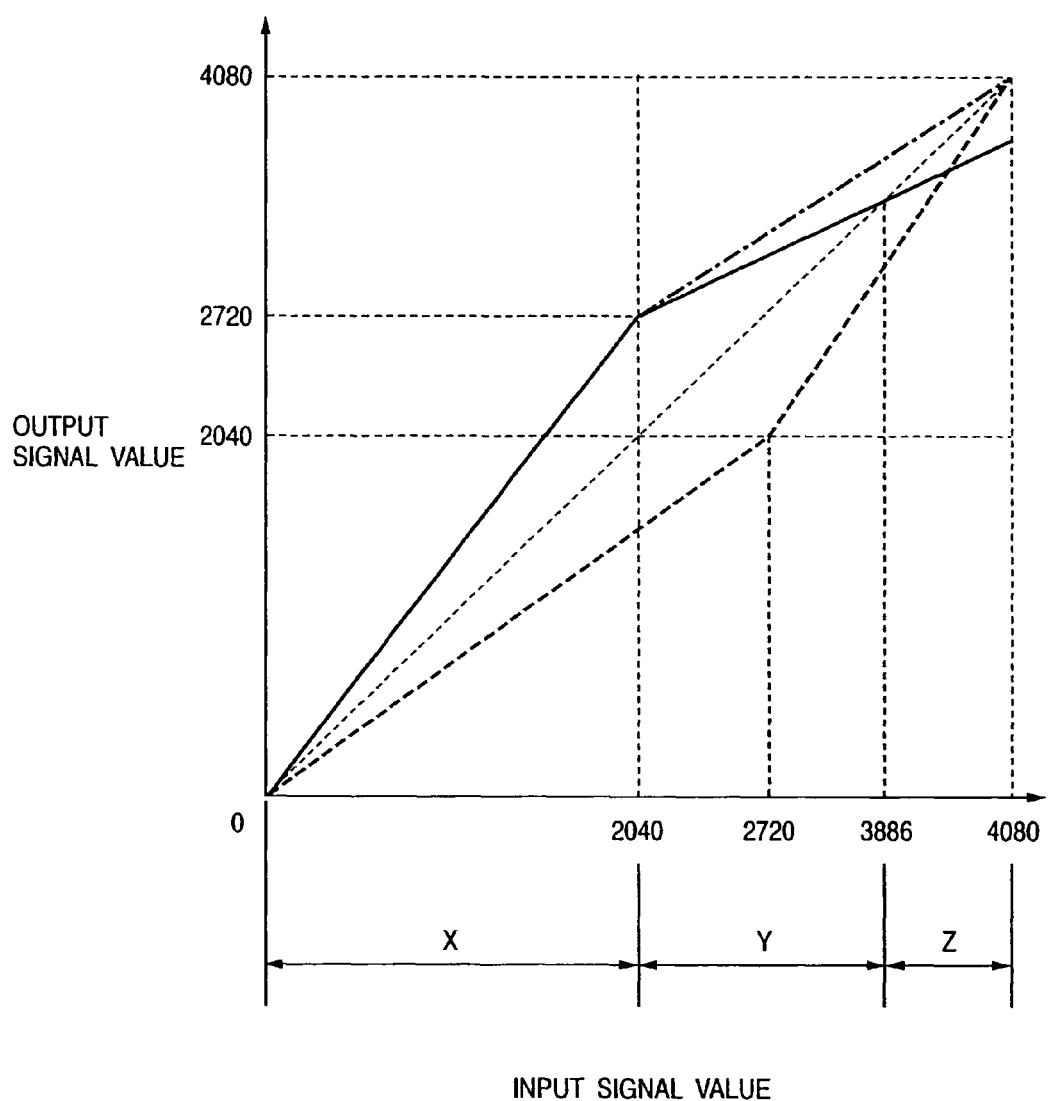
FIG. 32 is a graph showing a table used to convert a tone correction table in correction of index components.

An intermediate output gamma table indicated by the solid curve in FIG. 7 may be converted using an inverse index table which has a maximum value=4080, and is indicated by the one-dashed chain curve in FIG. 32. More specifically, all input values 0 to 255 are corrected using the intermediate output gamma table, and output values of the inverse index table are calculated for the obtained corrected input values, thus attaining conversion. However, when the intermediate output gamma table whose maximum value is not 4080 is converted in this way, a maximum value portion has obviously deviated. This is because when the maximum value is 3886 as in the third embodiment, the correction value to be input to the inverse index table is present in regions X and Y shown in FIG. 32 but is not present in region Z.

In consideration of the above problems, the third embodiment uses a table which is obtained based on the following conditions and changes depending on the maximum value of a tone correction table, as indicated by the solid curve in FIG. 32, as an inverse index table used to correct index components.

(a) An inflection between regions X and Y caused by the printer input/output characteristics is not influenced by a change in maximum value of a tone correction table.

(b) The maximum value of an intermediate output gamma table is preserved by conversion using an inverse index table. In other words, this value remains the same before and after conversion.

Therefore, correction values of input values 0 to 255 are respectively calculated using an intermediate output gamma table as correction values of a tone correction table, and correction using an inverse index table is made using the calculated correction values as inputs, thus obtaining the correction values of the inverse index table.

Generation of Tone Correction Table (S109)

The intermediate output gamma table converted by the inverse index table in step S202 is converted into a format that can be stored in a tone correction table database 1305 shown in FIG. 24, thus generating a tone correction table.

In this manner, the tone correction table for the print head of the middle ejection amount rank can be obtained.

In the above description, the method of deriving the tone correction table for the print head of the middle ejection amount rank has been explained. Also, tone correction tables for print heads of the large and small ejection amount ranks can be generated in the same sequence. More specifically, upon generating tone correction tables for print heads of the large and small ejection amount ranks, the maximum values are respectively set to 3709 and 4080, thus obtaining tone correction tables compatible to ejection amount correction.

Fourth Embodiment

A method of generating a tone correction table according to the fourth embodiment of the present invention will be described below. Note that the same reference numerals in this embodiment denote the same parts as those in the first and third embodiments, and a detailed description thereof will be omitted.

A case will be explained below wherein a color process is performed in a system using a printer 1400 which has the same ejection amount correction function as in the third embodiment and has nonlinear output characteristics, as shown in FIG. 24.

The fourth embodiment calculates an intermediate output gamma table while compensating for the nonlinear output characteristics of the printer 1400 using the method described in, e.g., the third embodiment upon calculating a tone correction table of the printer 1400 with the nonlinear output characteristics, and a tone correction table having an arbitrary maximum value is calculated using the obtained intermediate output gamma table. More specifically, an intermediate output gamma table having a maximum value=3886 is converted to generate an intermediate output gamma table having an arbitrary maximum value (e.g., 4706), and the intermediate output gamma table having the maximum value=4706 is converted into a tone correction table in a format that considers the nonlinear output characteristics of the printer 1400.

Figure 33:
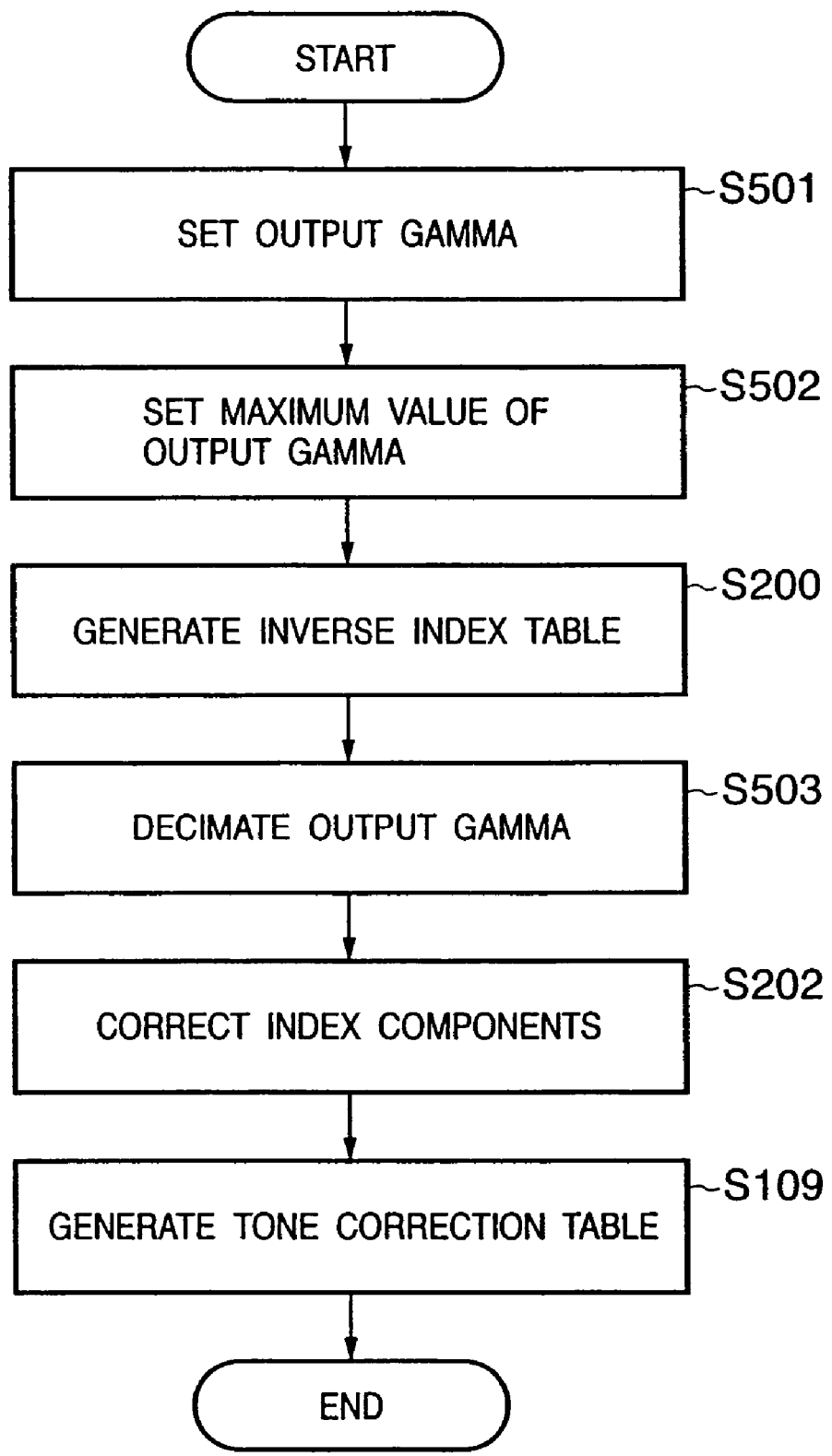
FIG. 33 is a flow chart showing the method of generating a tone correction table in the fourth embodiment.

FIG. 33 is a flow chart showing the method of generating a tone correction table of the fourth embodiment. Note that a case will be described below wherein a tone correction table for a print head of the large ejection amount rank, which has a maximum value=3709, is generated using an intermediate output gamma table having a maximum value=3886 for a print head of the middle ejection amount rank, which is generated by the same method as in the third embodiment.

Setup of Intermediate Output Gamma (S501)

Figure 36:
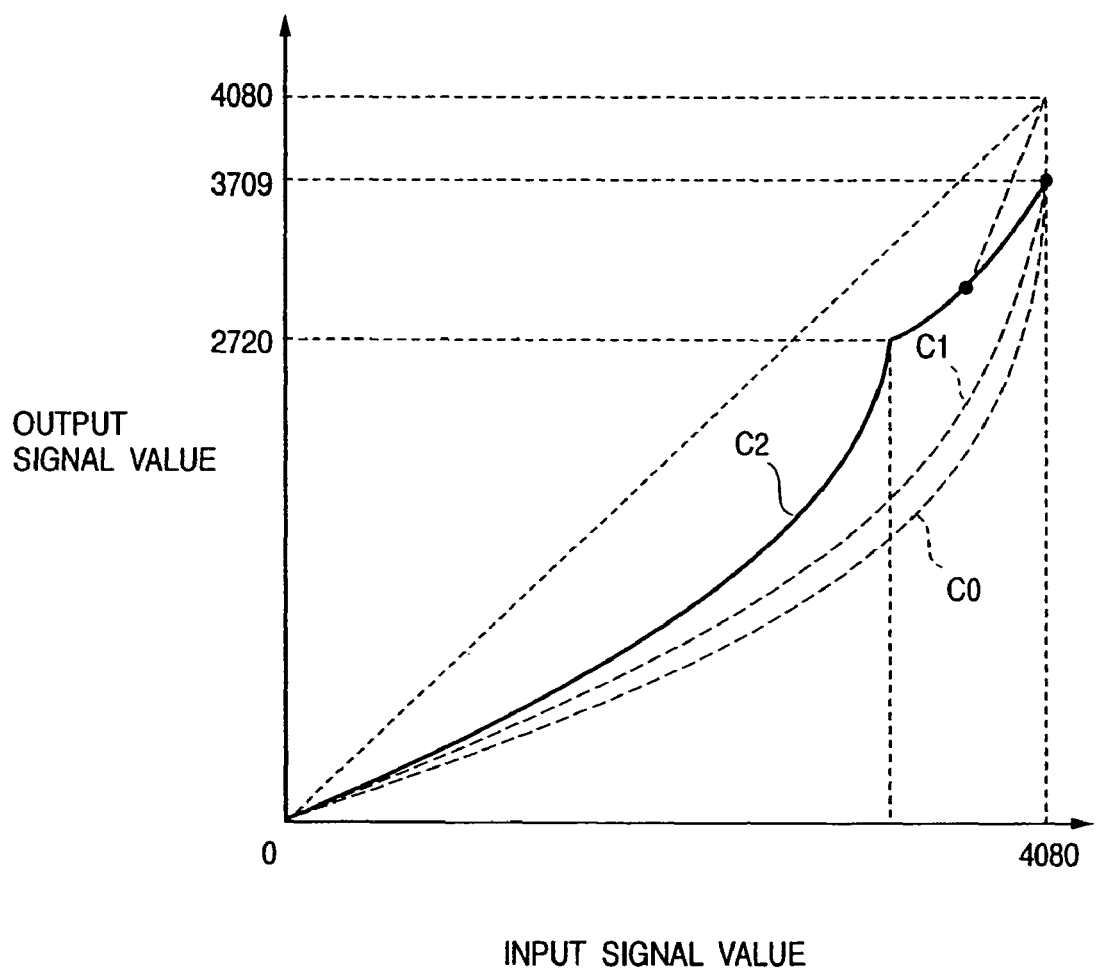
FIG. 36 is a graph for explaining the method of generating a tone correction table.

An intermediate output gamma table which is generated by the same method as in the third embodiment and has a maximum value=3886 is set. Note that this intermediate output gamma table has no inflection point, as in curve C1 in FIG. 36 (the maximum value is different), since it is obtained while compensating for the nonlinear output characteristics of the printer.

Setup of Maximum Value of Output Gamma (S502)

A maximum value of a tone correction table to be obtained is set. In the fourth embodiment, a maximum value—3709 is set for a print head of the large ejection amount rank.

Generation of Inverse Index Table (S200)

A table used to convert the intermediate output gamma table obtained while compensating for the nonlinear output characteristics of the printer into a tone correction table corresponding to the nonlinear output characteristics of the printer is generated. This process is substantially the same as "generation of inverse index table (S200)" in the third embodiment, except that the maximum value of the converted tone correction table is 3709. Therefore, the table generated in this step is obtained by replacing an input signal value "3886" in FIG. 32 by "3709". Of course, the inverse index table generated in this step is used in correction of index components (S202).

Decimation Process of Output Gamma (S503)

Conversion is made on the basis of the tone correction table having the arbitrary maximum value (3886 in this case), which is set in the step of setting the intermediate output gamma (S501), thereby generating an intermediate output gamma table having an arbitrary maximum value (3709 in this case). An arbitrary method can be used as the conversion method between tone correction tables having different maximum values. For example, the output values of the tone correction table with the set maximum value can undergo simple variable scaling. A tone correction table after variable scaling upon execution of simple variable scaling is given by:

Output value after variable scaling=ROUND(3709/ 3886×correction value before variable scaling)

where ROUND(•) is a function which inputs a solid number as an argument, rounds off the input solid number, and converts that value into an integer.

Correction of Index Components (S202)

The same process as in the third embodiment is executed using the inverse index table generated in step S200.

Generation of Tone Correction Table (S109)

The converted table is converted into a format of a tone correction table as in the third embodiment.

In the above description, the method of generating the tone correction table for the print head of the middle ejection amount rank has been explained. Also, tone correction tables for print heads of the large and small ejection amount ranks can be generated in the same sequence.

In the above description, a tone correction table for a print head of another ejection amount rank is calculated on the basis of the already generated tone correction table for a print head of the middle ejection amount rank. However, tables for any ejection amount ranks may be used a base tone correction table.

Fifth Embodiment

A method of generating a tone correction table according to the fifth embodiment of the present invention will be described below. Note that the same reference numerals in this embodiment denote the same parts as those in the first and third embodiments, and a detailed description thereof will be omitted.

The fifth embodiment will exemplify a case wherein a tone correction table having a maximum value=3709 for a print head of the large ejection amount rank is generated on the basis of a tone correction table generated using a print head of the middle ejection amount rank in a system using a printer which has the same ejection amount correction function as in the third embodiment and has nonlinear output characteristics, as shown in FIG. 24.

Figure 34:
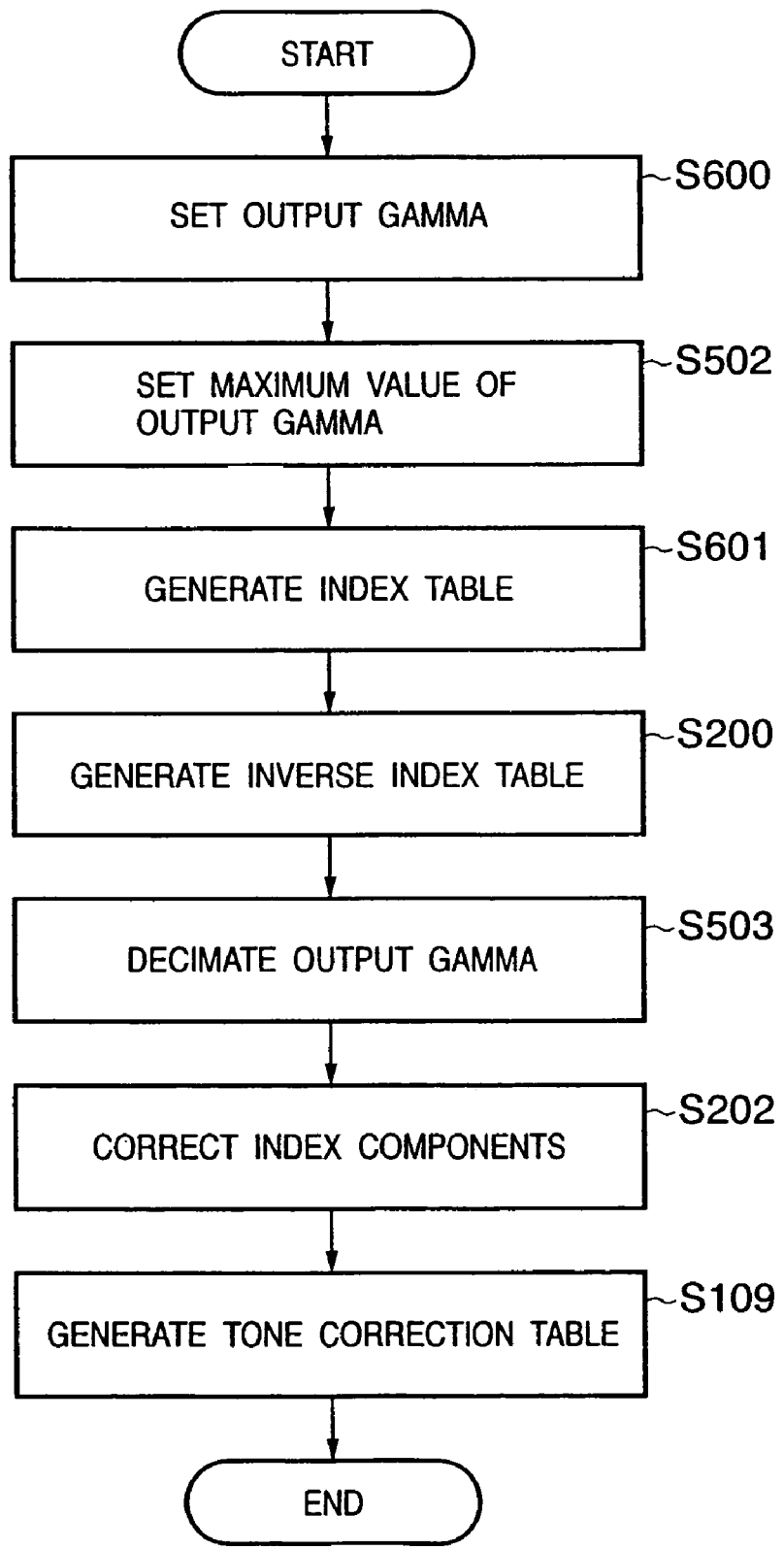
FIG. 34 is a flow chart showing the method of generating a tone correction table in the fifth embodiment.

FIG. 34 is a flow chart showing the method of generating a tone correction table of the fifth embodiment.

Setup of Output Gamma (S600)

A tone correction table which is generated by the same method as in the third embodiment and has a maximum value=3886 is set.

Setup of Maximum value of Output Gamma (S502)

A maximum value of a tone correction table is set to 3709 for a print head of the large ejection amount rank.

Generation of Index Table (S601)

Figure 35:
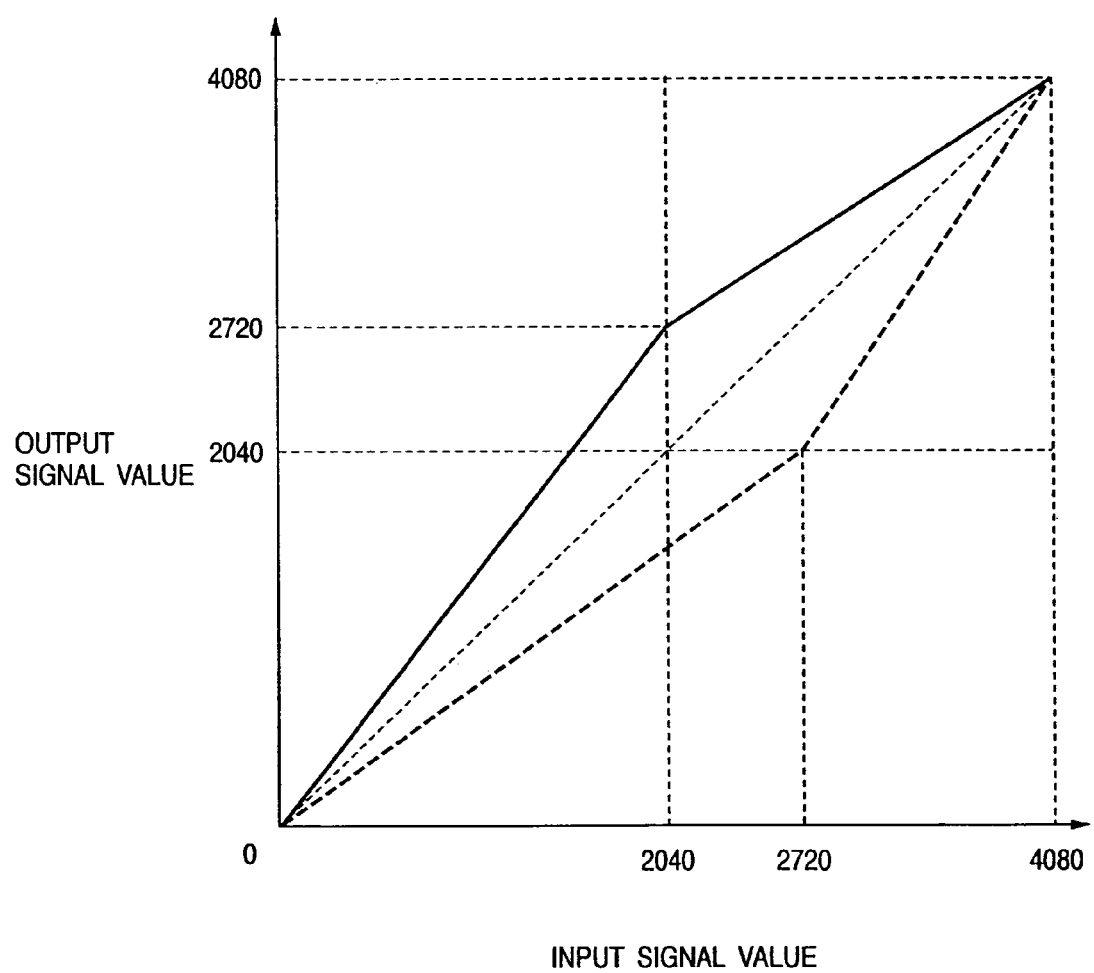
FIG. 35 is a graph for explaining the method of generating a tone correction table.

A table which is indicated by the solid curve in FIG. 35 and is an inverse function (broken curve) of the number of ON dots with respect to the input signal value upon using discontinuous index patterns, is generated. Since this table can be generated easily, a description of its generation method will be omitted.

Generation of Inverse Index Table (S200)

A table used to convert an intermediate output gamma table obtained, while compensating for the nonlinear output characteristics of the printer into a tone correction table corresponding to the nonlinear output characteristics of the printer is generated. This process is substantially the same as "generation of inverse index table (S200)" in the third embodiment, except that the maximum value of the converted tone correction table is 3709. Therefore, the table generated in this step is obtained by replacing an input signal value "3886" in FIG. 32 by "3709".

Generation of Intermediate Output Gamma (S201)

The output gamma table, which is set in step S600, corresponds to the nonlinear characteristics of the printer, and has the maximum value=3886, is converted using the index table generated in step S601 into a table which is obtained while compensating for the nonlinearity of the printer, as in the intermediate output gamma table of the third embodiment. More specifically, correction values of the output gamma table are calculated for all inputs, conversion is made by the index table using these correction values as inputs, and output values are used as an intermediate output gamma table (see the following equation).

Intermediate Opg[i]=index table [Opg[i]]

where Opg is the abbreviation for "output gamma", and i is an integer ranging from 0 to 255.

Decimation Process of Output Gamma (S503)

The obtained intermediate output gamma table undergoes a decimation process as in the fourth embodiment.

Correction of Index Components (S202)

The same process as in the fourth embodiment is executed using the inverse index table generated in step S200.

Generation of Tone Correction Table (S109)

The converted table is converted into a format of a tone correction table as in the third embodiment.

The above embodiments adopt the method of smoothing data using a recursive curve after an inverse table of an input signal value—output density table is calculated unlike in Japanese Patent Publication No. 8-2659. However, a tone correction table may be obtained using a method of calculating an inverse table after data of an input signal value—output density table are smoothed, as in Japanese Patent Publication No. 8-2659.

In the above example, combinations of dots which have the same size and correspond to an identical ink type are used as index patterns. However, in case of a printer which can selectively print small and large dots, combinations of small and large dots may be used as index patterns. Also, in case of a printer which uses two types of inks, i.e., light and dark inks, combinations of light and dark dots may be used as index patterns. In these cases, the method of generating a tone correction table of the above embodiment can be applied.

Furthermore, in the above example, the number of inflection points of the print density curve caused by switching of index patterns is one. However, the number of inflection points is not limited to one, and the method of generating a tone correction table of the above embodiment can be applied to a system having two or more inflection points.

Of course, the method of generating a correction table of this embodiment is not limited to an ink-jet printer using discontinuous index patterns, and can be widely applied to various other printing apparatuses which have discontinuous output characteristics with respect to input characteristics (e.g., a CRT hard copy apparatus).

Modification

Simple Method of Index Component Correction

In the fourth and fifth embodiments, a table which preserves a desired maximum value, as shown in FIG. 32, is used as an inverse index table used in correction of index components. However, an inverse index table that preserves a maximum value=4080 shown in FIG. 35 may be used in place of the table which preserves a desired maximum value, the terminal end portion of a tone correction table (curve C1 shown in FIG. 36) that has undergone index component correction using the inverse index table may be interpolated by a line to obtain curve C2 shown in FIG. 36.

In this manner, although the accuracy drops slightly, one permanent table can be used as an inverse index table. In this case, a simpler system arrangement can be realized since the memory required to store the inverse index table can be reduced, the processing time required to re-calculate the inverse index table can be shortened, and so forth.

Another Method of Output Gamma Decimation Process

In the above embodiments, as a method of generating tone correction tables having different maximum values, the tone correction values of the intermediate output gamma table, which is generated while compensating for the nonlinear output characteristics, undergo simple variable scaling to obtain tone correction tables having different maximum values. When all tone correction tables for respective colors undergo simple variable scaling, the color balance after the output gamma decimation process can be maintained even using tone correction tables having different maximum values. Note that a method that can preserve the linearity of the output density characteristics may be used as the output gamma decimation process. In this case, a color process can be done using tone correction tables having different maximum values, and the density characteristics of an output image can be preserved.

Arrangement of System Using Tone Correction Table

Figure 26:
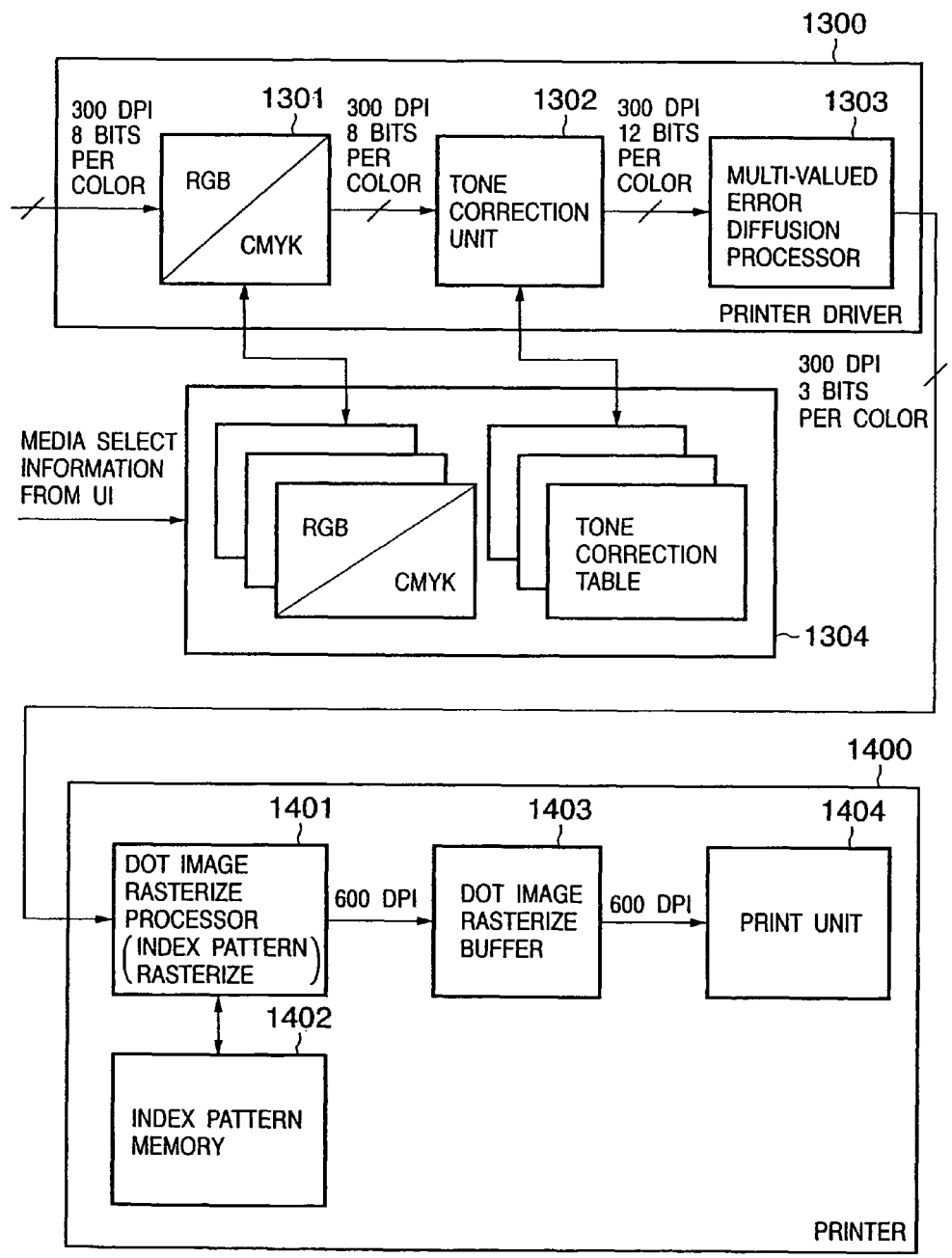
FIG. 26 is a block diagram showing the arrangement of a printer driver (color processing unit) which runs on a host, and an ink-jet printer.

The tone correction table generated in each of the above embodiments is used in a system which makes ejection amount correction of a print head. However, the generated tone correction table can also be used in a system which makes dot quantity correction shown in FIG. 26.

Note that tone correction tables corresponding to respective ejection amount ranks of print heads are as shown in FIG. 30, and are not simply integer multiples of the full definition range among them. That is, even when the maximum value of a tone correction table is converted using a dot quantity ratio, a target dot quantity cannot often be achieved.

When the generated tone correction table is used in dot quantity correction, for example, a measure for detecting the maximum value of a tone correction table that meets a dot quantity while gradually decreasing the maximum value of a tone correction table is required.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

As many apparently widely different embodiments of the present invention can be made without departing from the spirit and scope thereof, it is to be understood that the invention is not limited to the specific embodiments thereof except as defined in the claims.

What is claimed is:

1. A generation method of generating a correction table used to correct print characteristics of a printing apparatus in accordance with an input signal, and characteristics of the printing apparatus between the input signal and an ink dot quantity to be output having a switching point of slopes, the method comprising steps of:

printing images while compensating for the characteristics having the switching point of slopes;
measuring amounts of brightness of the printed images;
generating a tone correction table based on the measured amounts of brightness; and
applying a conversion that considers the characteristics having the switching point of slopes to the tone correction table, wherein the printing apparatus uses at least one ink, and represents a tone of a pixel by a plurality of dots having at least one dot size.

2. A control method of a generator for generating a correction table used to correct print characteristics of a printing apparatus in accordance with an input signal, and characteristics of the printing apparatus between the input signal and an ink dot quantity to be output having a switching point of slopes, the method comprising steps of:

supplying images for measuring amounts of brightness, the characteristics having the switching point of slopes of which have been compensated for, to the printing apparatus;
generating a tone correction table based on amounts of brightness which are obtained by measuring printed images; and
applying conversion that considers the characteristics, which has the switching point of slopes, to the tone correction table, wherein the printing apparatus uses at least one ink, and represents a tone of a pixel by a plurality of dots having at least one dot size.

3. A computer program for a method of generating a correction table used to correct print characteristics of a printing apparatus in accordance with an input signal, and characteristics of the printing apparatus between the input signal and ink dot quantity to be output having a switching point of slopes, the method comprising the steps of:

printing images for measuring amounts of brightness while compensating for the characteristics having the switching point of slopes;
measuring amounts of brightness of the printed images;
generating a tone correction table based on the measured amounts of brightness; and
applying a conversion that considers the characteristics having the switching point of slopes to the tone correction table, wherein the printing apparatus uses at least one ink, and represents a tone of a pixel by a plurality of dots having at least one dot size.

4. A computer program product stored on a computer readable medium that includes computer program code for causing a computer to perform a method of generating a correction table used to correct print characteristics of a printing apparatus in accordance with an input signal, and characteristics of the printing apparatus between the input signal and an ink dot quantity to be output having a switching point of slopes, the method comprising steps of:

printing images for measuring amounts of brightness while compensating for the characteristics having the switching point of slopes;
measuring amounts of brightness of the printed images;
generating a tone correction table based on the measured amounts of brightness; and
applying a conversion that considers the characteristics having the switching point of slopes to the tone correction table, wherein the printing apparatus uses at least one ink, and represents a tone of a pixel by a plurality of dots having at least one dot size.

5. A computer program product stored on a computer readable medium that includes computer code for causing a computer to perform a controlling method of a generator for generating a correction table used to correct print characteristics of a printing apparatus in accordance with an input signal, and characteristics of the printing apparatus between the input signal and ink dot quantity to be output having a switching point of slopes, the method comprising steps of:

supplying images for measuring amounts of brightness, the characteristics having the switching point of slopes of which have been compensated for, to the printing apparatus;

generating a tone correction table based on amounts of brightness which are obtained by measuring printed images; and applying conversion that considers the characteristics, which has the switching point of slopes, to the tone correction table, wherein the printing apparatus uses at least one ink, and represents a tone of a pixel by a plurality of dots having at least one dot size.

6. A computer program product stored on a computer readable medium that includes computer program code for causing a computer to perform a controlling method of a generator for generating a correction table used to correct print characteristics of a printing apparatus in accordance with an input signal, and characteristics of the printing apparatus between the input signal and ink dot quantity to be output having a switching point of slopes, the method comprising steps of:

supplying images for measuring amounts of brightness, the characteristics having the switching point of slopes of which have been compensated for, to the printing apparatus;

generating a tone correction table based on amounts of brightness which are obtained by measuring printed images; and applying conversion that considers the characteristics having the switching point of slopes to the tone correction table, wherein the printing apparatus uses at least one ink, and represents a tone of a pixel by a plurality of dots having at least one dot size.

7. An image recording apparatus comprising:

a tone converter, configured to apply tone conversion on an input signal value and produce a tone-converted signal; and a dot converter, configured to convert the tone-converted signal value to dots using discontinuous index patterns to form an image, wherein the tone converter generates a tone conversion table by:

generating an inverse function table, which indicates a correspondence between the input signal value and a number of the dots;

processing signal values of plural patches using the inverse function table so as to form the plural patches represented by the processed signal values using the dot converter;

measuring densities of the formed plural patches;

generating an intermediate output gamma table in accordance with the measured densities; and generating the tone conversion table from the inverse function table and the intermediate output gamma table.

8. The apparatus according to claim 7, wherein the tone converter is included in a printer driver.

9. The apparatus according to claim 7, wherein each of the plural patches has a predetermined density of cyan, magenta, yellow, or black color.

* * * * *